United States Patent
Tang

(10) Patent No.: US 10,959,150 B2
(45) Date of Patent: *Mar. 23, 2021

(54) METHOD AND APPARATUS FOR TRANSMITTING DATA

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/893,954

(22) Filed: Jun. 5, 2020

(65) Prior Publication Data
US 2020/0305053 A1    Sep. 24, 2020

Related U.S. Application Data

(63) Continuation of application No. 16/098,518, filed as application No. PCT/CN2016/088245 on Jul. 1, 2016, now Pat. No. 10,708,838.

(51) Int. Cl.
*H04W 36/30* (2009.01)
*H04W 36/00* (2009.01)
(Continued)

(52) U.S. Cl.
CPC .......... *H04W 36/30* (2013.01); *H04W 24/10* (2013.01); *H04W 36/00* (2013.01);
(Continued)

(58) Field of Classification Search
CPC ..... H04W 36/30; H04W 36/22; H04W 36/08; H04W 36/0069; H04W 76/27; H04W 76/15; H04W 24/10; H04W 36/00
See application file for complete search history.

(56) References Cited

U.S. PATENT DOCUMENTS 9,526,044 B2    12/2016  Choi et al.
2010/0279682 A1*  11/2010  Rangaiah .............. H04W 24/10
                                                      455/426.1
(Continued)

FOREIGN PATENT DOCUMENTS

CN    102348256 A    2/2012
CN    103581933 A    2/2014
(Continued)

OTHER PUBLICATIONS

International Search Report in international application No. PCT/CN2016/088245, dated Mar. 29, 2017.
(Continued)

*Primary Examiner* — Christopher M Brandt

(57) ABSTRACT

Embodiments of the present invention provide a method for transmitting data. The method comprises: a first primary network device receives measurement result information of a secondary network device sent by a terminal device during access to the first primary network device, the measurement result information being used for indicating the quality of a link between the secondary network device and the terminal device; the first primary network device determines, according to the quality of the link between the secondary network device and the terminal device, to establish a secondary connection between the secondary network device and the terminal device; the first primary network device establishes the secondary connection. Thus the transmission load of the first primary network device can be reduced.

20 Claims, 9 Drawing Sheets

(51) Int. Cl.
  *H04W 76/15* (2018.01)
  *H04W 76/27* (2018.01)
  *H04W 24/10* (2009.01)
  *H04W 36/08* (2009.01)
  *H04W 36/22* (2009.01)

(52) U.S. Cl.
  CPC ....... *H04W 36/0069* (2018.08); *H04W 36/08* (2013.01); *H04W 36/22* (2013.01); *H04W 76/15* (2018.02); *H04W 76/27* (2018.02)

(56) References Cited

U.S. PATENT DOCUMENTS

| | | | |
|---|---|---|---|
| 2013/0021929 A1 | 1/2013 | Kim | |
| 2013/0136025 A1* | 5/2013 | Li | H04W 28/08 370/252 |
| 2014/0080484 A1 | 3/2014 | Centonza | |
| 2014/0092866 A1 | 4/2014 | Teyeb | |
| 2014/0206361 A1 | 7/2014 | Centonza et al. | |
| 2014/0293958 A1 | 10/2014 | Teyeb et al. | |
| 2014/0313902 A1* | 10/2014 | Bruner | H04W 28/0289 370/238 |
| 2014/0321267 A1 | 10/2014 | Jiang et al. | |
| 2014/0335869 A1* | 11/2014 | Choi | H04W 40/36 455/438 |
| 2015/0263836 A1 | 9/2015 | Kim | |
| 2015/0382221 A1* | 12/2015 | Dalsgaard | H04W 76/28 370/252 |
| 2016/0127961 A1 | 5/2016 | Wang et al. | |
| 2016/0142927 A1 | 5/2016 | Yilmaz et al. | |
| 2016/0192245 A1 | 6/2016 | He et al. | |
| 2017/0195935 A1* | 7/2017 | Xu | H04W 36/30 |
| 2017/0208488 A1* | 7/2017 | Hwang | H04W 76/34 |

FOREIGN PATENT DOCUMENTS

| | | |
|---|---|---|
| CN | 103888936 A | 6/2014 |
| CN | 104301955 A | 1/2015 |
| CN | 104378793 A | 2/2015 |
| CN | 104581810 A | 4/2015 |
| CN | 105307269 A | 2/2016 |
| CN | 105376801 A | 3/2016 |
| EP | 2802168 A1 | 11/2014 |
| EP | 2838292 A1 | 2/2015 |
| EP | 3051876 A1 | 8/2016 |
| JP | 2009540722 A | 11/2009 |
| JP | 2009544210 A | 12/2009 |
| JP | 2015527846 A | 9/2015 |
| JP | 2016514916 A | 5/2016 |
| WO | 2014021761 A2 | 2/2014 |
| WO | 2014205711 A1 | 12/2014 |
| WO | 2015001166 A1 | 1/2015 |
| WO | 2015039449 A1 | 3/2015 |
| WO | 2015115573 A1 | 8/2015 |
| WO | 2015170476 A1 | 11/2015 |
| WO | 2016038763 A1 | 3/2016 |
| WO | 2016072904 A1 | 5/2016 |

OTHER PUBLICATIONS

English translation of the Written Opinion of the International Search Authority in the international application No. PCT/CN2016/088245, dated Mar. 29, 2017.
Supplementary European Search Report in the European application No. 16906840.0, dated Apr. 15, 2019.
First Office Action of the U.S. Appl. No. 16/098,518, dated Aug. 6, 2019.
Final Office Action of the U.S. Appl. No. 16/098,518, dated Nov. 29, 2019.
Notice of Allowance of the U.S. Appl. No. 16/098,518, dated Mar. 5, 2020.
Notice of Advisory Action of the U.S. Appl. No. 16/098,518, dated Jan. 31, 2020.
First Office Action of the Chinese application No. 201680085540.1, dated Jul. 3, 2020.
First Office Action of the European application No. 16906840.0, dated Jun. 3, 2020.
First Office Action of the Japanese application No. 2018-563656, dated Jun. 12, 2020.
Office Action of the Indian application No. 201817047839, dated Jul. 23, 2020.
First Office Action of the Taiwanese application No. 106121728, dated Nov. 9, 2020.

* cited by examiner

METHOD AND APPARATUS FOR TRANSMITTING DATA

CROSS-REFERENCE TO RELATED APPLICATION

This application is a continuation application of U.S. application Ser. No. 16/098,518, filed on Nov. 2, 2018, which is a national stage application of International Patent Application No. PCT/CN2016/088245 filed on Jul. 1, 2016, the disclosure of which is incorporated by reference herein in their entity.

TECHNICAL FIELD

The disclosure relates to the field of communication, and more particularly to a method and device for data transmission.

BACKGROUND

In a deployment scenario of a non-standalone network, a terminal device may receive or transmit data through both of a Long Term Evolution (LTE) network and a New Radio (NR) network. Such a technology may be called a multiple (dual) connectivity technology.

A primary connection and one or more secondary connections exist in multiple (dual) connections of the terminal device. The primary connection is a network connection between the terminal device and a primary network device, and the secondary connection is a network connection between the terminal device and a secondary network device. For example, in a deployment scenario of an LTE & NR cell, the primary network device may be a network device of the LTE network, and the secondary network device may be a network device of the NR network. Control-plane data of the terminal device is transmitted through a primary link. User-plane data of the terminal device may be divided into two paths for simultaneous transmission through the primary connection and the secondary connection, so as to increase a user-plane data throughput. Or the user-plane data may also be transmitted only through the secondary connection, thereby reducing a load of the primary network device. However, offloading of the user-plane data or the control-plane data is only implemented in a data transmission process. Along with increase of a network throughput, the transmission load of the primary network device increases. Therefore, it is necessary to further improve a capability of the secondary network device in offloading data of the primary network device.

SUMMARY

Embodiments of the disclosure provide a method and device for data transmission, which may reduce a transmission load of a primary network device.

A first aspect provides a method for data transmission, which may include that: a first primary network device receives measurement result information of a secondary network device, transmitted by a terminal device in a process of accessing the first primary network device, the measurement result information being configured to indicate link quality between the secondary network device and the terminal device; the first primary network device determines to establish a secondary connection between the secondary network device and the terminal device according to the link quality between the secondary network device and the terminal device; and the first primary network device establishes the secondary connection.

In such case, the terminal device may transmit the measurement result information of the secondary network device to the first primary network device in the process of accessing the first primary network device, the first primary network device, after receiving the measurement result information of the terminal device, determines that the secondary connection between the secondary network device and the terminal device is required to be established according to the measurement result information, then the first primary network device establishes the secondary connection and the terminal device transmits data through the secondary connection. In such a manner, the terminal device transmits the measurement result information of the secondary network device to the first primary network device in the access process, so that the data may be offloaded to the secondary network device as soon as possible, the data may be offloaded for the first primary network device through the secondary connection established by the first primary network device as soon as possible, and a transmission load of the first primary network device may be reduced.

Alternatively, the secondary connection is configured to transmit control-plane data and/or user-plane data. In a conventional art, only the user-plane data is shared for the first primary network device in a data connection process. In such case, the secondary connection established by the first primary network device in the process that the terminal device accesses the first primary network device may not only offload the user-plane data for the first primary network device but also offload the control-plane data for the first primary network device. Therefore, an offloading capability of the secondary network device for the primary network device is further improved, and the transmission load of the first primary network device is reduced.

In a first possible implementation mode of the first aspect, the operation that the first primary network device receives the measurement result information of the secondary network device, transmitted by the terminal device in the process of accessing the first primary network device, may include that: the first primary network device receives the measurement result information carried in a Radio Resource Control (RRC) connection establishment request message or an RRC connection establishment complete message.

In the embodiments of the disclosure, the process that the terminal device accesses the first primary network device may be as follows. The terminal device in an idle state transmits the RRC connection establishment request message to the first primary network device, or the terminal device transmits the RRC connection establishment complete message to the first primary network device. Both of the two messages may carry the measurement result information of the secondary network device. Then, when the terminal device in the idle state has data to be transmitted, the measurement result information is transmitted to the first primary network device through the two messages in the access process as soon as possible, so that the secondary network device may offload the data for the first primary network device as soon as possible, and the transmission load of the first primary network device is further reduced.

In combination with the abovementioned possible implementation mode of the first aspect, in a second possible implementation mode of the first aspect, the operation that the first primary network device receives the measurement result information of the secondary network device, transmitted by the terminal device in the process of accessing the primary network device, may include that: the first primary network device receives the measurement result information carried in a handover request message of a second primary network device, the handover request message being further configured to request a network device serving the terminal device to be switched from the second primary network device to the first primary network device.

In the embodiments of the disclosure, the process that the terminal device accesses the first primary network device may be as follows. In a process of switching the second primary network device to the first primary network device, the second primary network device is a source network device and the first primary network device is a target network device. Specifically, the measurement result information of the secondary network device may be carried in the handover request message transmitted to the first primary network device by the second primary network device. The terminal device measures the secondary network device and carries the generated measurement result information in a measurement report transmitted to the second primary network device. The second primary network device, when receiving the measurement report, acquires the measurement result information of the secondary network device in the measurement report. The second primary network device, responsive to determining to handover according to the measurement report, carries the measurement result information of the secondary network device in the handover request message transmitted to the first primary network device. The first primary network device, when receiving the handover request message, transmits the measurement result information of the secondary network device in the handover request message to the secondary network device. In such a manner, the secondary network device may offload the data for the first primary network device as soon as possible when handover is implemented.

In combination with the abovementioned possible implementation modes of the first aspect, in a third possible implementation mode of the first aspect, the operation that the first primary network device receives the measurement result information of the secondary network device, transmitted by the terminal device in the process of accessing the primary network device, may include that: the first primary network device receives the measurement result information carried in a handover complete message from the terminal device, the handover complete message being further configured to indicate that the network device serving the terminal device has been switched from the second primary network device to the first primary network device.

In the embodiments of the disclosure, the process that the terminal device accesses the first primary network device may also be a process that the terminal device transmits the handover complete message to the first primary network device in a handover process, and the measurement information may be carried in the handover complete message for transmitting to the first primary network device.

In combination with the abovementioned possible implementation modes of the first aspect, in a fourth implementation mode of the first aspect, the operation that the first primary network device establishes the secondary connection may include that: after the first primary network device receives the handover request message transmitted by the second primary network device, the first primary network device transmits an acknowledgement message of the handover request message to the second primary network device, the acknowledgement message of the handover request message carrying configuration information of the secondary connection to enable the second network device to transmit the configuration information of the secondary connection to the terminal device and the configuration information of the secondary connection being configured to establish the secondary connection between the secondary network device and the terminal device.

In the embodiments of the disclosure, the first primary network device is required to acquire the configuration information of the secondary connection for establishment of the secondary connection. When the second primary network device transmits the handover request message to the first primary network device, the configuration information of the secondary connection may be carried in the acknowledgement message of the handover request message, returned to the second primary network device by the first primary network device. Then, before handover, the second primary network device may transmit the configuration information of the secondary connection to the terminal device to enable the terminal device to establish the secondary connection with the secondary network device as soon as possible in the process of accessing the first network device.

In combination with the abovementioned possible implementation modes of the first aspect, in a fifth implementation mode of the first aspect, before the operation that the first primary network device receives the measurement result information of the secondary network device, transmitted by the terminal device in the process of accessing the primary network device, the method may further include that: the first primary network device transmits first indication information to the terminal device, the first indication information being configured to instruct the terminal device to transmit the measurement result information to the first primary network device, wherein the operation that the first primary network device receives the measurement result information of the secondary network device, transmitted by the terminal device in the process of accessing the primary network device, may include that: the first primary network device receives the measurement result information transmitted by the terminal device according to the first indication information.

In the embodiments of the disclosure, the first primary network device is required to transmit the first indication information to the terminal device to instruct the terminal device to report the measurement result information of the secondary network device. For example, the first indication information indicates a report manner for the measurement result information of the secondary network device and a report time, specifically bytes occupied by the reported information and the like.

Alternatively, before the operation that the first primary network device transmits the first indication information to the terminal device, the method further includes that: the terminal device may transmit third indication information to the first primary network device, and the first primary network device receives the third indication information from the terminal device, the third indication information being configured to indicate whether the terminal device stores result indication information of the secondary network device or not. Furthermore, the terminal device may carry the third indication information in an uplink message transmitted to the first primary network device. For example, if a special byte location in a certain uplink message is 0, it is indicated that the terminal device does not store measurement indication information and, if the special byte location is 1, it is indicated that the terminal device stores the measurement indication information. When receiving the third indication information transmitted by the terminal device, the first primary network device, responsive to determining that the terminal device stores the measurement result indication information, transmits the first indication information to the terminal device to instruct the terminal device to report the measurement result information.

In combination with the abovementioned possible implementation modes of the first aspect, in a sixth implementation mode of the first aspect, the operation that the first primary network device establishes the secondary connection may include that: the first primary network device transmits a secondary connection addition request message to the secondary network device, the secondary connection addition request message being configured to request the secondary network device to be added as a network device for data transmission; the first primary network device receives an acknowledgement message of the secondary connection addition request message from the secondary network device, the acknowledgement message of the secondary connection addition request message carrying the configuration information of the secondary connection and the configuration information of the secondary connection being configured to establish the secondary connection between the secondary network device and the terminal device; the first primary network device acquires the configuration information of the secondary connection, and the first primary network device transmits the configuration information of the secondary connection to the terminal device.

In the embodiments of the disclosure, the first primary network device is required to acquire the configuration information of the secondary connection for establishment of the secondary connection. Specifically, the first primary network device may transmit the secondary connection addition request message to the secondary network device, the secondary connection addition request message carrying the measurement result information. The secondary network device, when receiving the secondary connection addition request message, determines whether establishment of the secondary connection is allowed or not according to the measurement result information in the secondary connection addition request message and its own load condition and, responsive to determining that establishment of the secondary connection is allowed, returns the acknowledgement message of the secondary connection addition request message to the first primary network device, the acknowledgement message carrying the configuration information of the secondary connection. The secondary network device, responsive to determining that establishment of the secondary connection is not allowed, returns failure indication information to the first primary network device to indicate a cause of a secondary connection establishment failure. Then, the first primary network device, when subsequently receiving the same measurement result, may select not to transmit the secondary connection addition request message to the secondary network device according to the cause of the secondary connection establishment failure. Power consumption of the first primary network device is further reduced.

In combination with the abovementioned possible implementation modes of the first aspect, in a seventh implementation mode of the first aspect, the operation that the first primary network device determines to establish the secondary connection between the secondary network device and the terminal device according to the measurement result information may include that: the first primary network device determines to establish the secondary connection between the secondary network device and the terminal device according to a load condition of the first primary network device and the measurement result information.

Specifically, when the measurement result information of the secondary network device indicates that the secondary network device is in good network condition and a present load of the first primary network device is heavy, the secondary connection is determined to be established to offload the data for the first primary network device. When the measurement result information of the secondary network device indicates that the secondary network device is in ordinary network condition and the load of the primary network device is light, the secondary connection may not be established.

In combination with the abovementioned possible implementation modes of the first aspect, in an eighth implementation mode of the first aspect, the method may further include that: the first primary network device transmits configuration information of a primary connection to the terminal device, the configuration information of the primary connection being configured for the terminal device to establish the primary connection with the first primary network device and the primary connection being configured for data transmission.

In the embodiments of the disclosure, the secondary connection between the terminal device and the secondary network device may be configured for data transmission and the primary connection between the terminal device and the first primary network device may also be configured for data transmission. When the primary connection between the first primary network device and the terminal device transmits the data, the configuration information of the primary connection and the configuration information of the secondary connection are required to be transmitted to the terminal device. Specifically, the configuration information of the primary connection and the configuration information of the secondary connection are transmitted to the terminal device together. For example, the configuration information of the primary connection and the configuration information of the secondary connection may be transmitted to the terminal device together through an RRC connection reconfiguration message. Then, the terminal device, after receiving the configuration information of the two connections, transmits the data according to the configuration information of the two connections respectively.

In combination with the abovementioned possible implementation modes of the first aspect, in a ninth implementation mode of the first aspect, the first primary network device may be a network device in an LTE network and the secondary network device may be a network device in a 5th-Generation (5G) network.

In combination with the abovementioned possible implementation modes of the first aspect, in a tenth implementation mode of the first aspect, the secondary connection may be configured to transmit first control-plane data and/or user-plane data.

In combination with the abovementioned possible implementation modes of the first aspect, in an eleventh implementation mode of the first aspect, the acknowledgement message of the secondary connection addition request message may further carry identification information of at least one secondary cell and the at least one secondary cell may be a cell served by the secondary network device; and after the operation that the first primary network device determines to establish the secondary connection between the secondary network device and the terminal device according to the measurement information, the method may further include that: the first primary network device transmits the identification information of the at least one secondary cell to the terminal device to enable the terminal device to access the at least one secondary cell according to the identification information.

In combination with the abovementioned possible implementation modes of the first aspect, in a twelfth implementation mode of the first aspect, after the operation that the first primary network device establishes the secondary connection, the method may further include that: the first primary network device transmits second indication information to the secondary network device, the second indication information being configured to instruct the secondary network device to transmit the first control-plane data.

A second aspect provides a method for data transmission, wherein a terminal device transmits measurement result information of a secondary network device to a first primary network device in a process of accessing the first primary network device to enable the first primary network device to acquire configuration information of a secondary connection according to the measurement result information, the measurement result information being configured to indicate link quality between the secondary network device and the terminal device, the terminal device receives the configuration information of the secondary connection from the first primary network device, and the terminal device accesses the secondary network device according to the configuration information of the secondary connection.

In a first possible implementation mode of the second aspect, the operation that the terminal device transmits the measurement result information of the secondary network device to the first primary network device in the process of accessing the first primary network device may include that: the terminal device transmits the measurement result information to the first primary network device through an RRC connection establishment request message or an RRC connection establishment complete message.

In the abovementioned possible implementation mode of the second aspect, in a second implementation mode of the second aspect, the operation that the terminal device transmits the measurement result information of the secondary network device to the first primary network device in the process of accessing the first primary network device may include that: the terminal device transmits the measurement result information to the first primary network device through a second primary network device, the measurement result information being carried in a measurement report transmitted to the second primary network device by the terminal device to enable the second primary network device to transmit a handover request message to the first primary network device according to the measurement report, the handover request message carrying the measurement result information and the handover request message being further configured to request a network device serving the terminal device to be switched from the second primary network device to the first primary network device.

In combination with the abovementioned possible implementation modes of the second aspect, in a third implementation mode of the second aspect, the operation that the terminal device transmits the measurement result information of the secondary network device to the first primary network device in the process of accessing the primary network device may include that: the terminal device transmits the measurement result information to the first primary network device through a handover complete message, the handover complete message being further configured to indicate that the network device serving the terminal device has been switched from the second primary network device to the first primary network device.

In combination with the abovementioned possible implementation modes of the second aspect, in a fourth implementation mode of the second aspect, before the operation that the terminal device transmits the measurement result information of the secondary network device to the first primary network device in the process of accessing the primary network device, the method may further include that: the terminal device receives first indication information transmitted by the first primary network device, the first indication information being configured to instruct the terminal device to transmit the measurement result information to the first primary network device, wherein the operation that the terminal device transmits the measurement result information of the secondary network device to the first primary network device in the process of accessing the primary network device may include that: the terminal device transmits the measurement result information to the first primary network device in the process of accessing the first primary network device according to the first indication information.

In combination with the abovementioned possible implementation modes of the second aspect, in a fifth implementation mode of the second aspect, before the operation that the terminal device transmits the measurement result information of the secondary network device to the first primary network device in the process of accessing the first primary network device, the method may further include that: when channel quality between the terminal device and the secondary network device meets a preset condition, the terminal device transmits the measurement result information to the first primary network device in the process of accessing the first primary network device.

In combination with the abovementioned possible implementation modes of the second aspect, in a sixth implementation mode of the second aspect, the method may further include that: the terminal device receives configuration information of a primary connection from the first primary network device, the configuration information of the primary connection being configured for the terminal device to establish the primary connection with the first primary network device and the primary connection being configured for data transmission.

In combination with the abovementioned possible implementation modes of the second aspect, in a seventh implementation mode of the second aspect, before the operation that the terminal device accesses the secondary network device according to the configuration information of the secondary connection, the method may further include that: the terminal device receives identification information of at least one secondary cell from the first primary network device, the at least one secondary cell being a cell served by the secondary network device, wherein the terminal device may access the secondary network device according to the configuration information of the secondary connection, and the terminal may access the secondary network device according to the configuration information of the secondary connection and the identification information of the at least one secondary cell.

A third aspect provides a method for data transmission, which may include that: a second primary network device receives measurement result information transmitted by a terminal device, the measurement result information being configured to indicate link quality between a secondary network device and the terminal device.

The second primary network device transmits the measurement result information to a first primary network device to enable the first primary network device to determine to establish a secondary connection between the secondary network device and the terminal device according to the measurement result information, the first network device being a target network device for handover of the terminal device and the second network device being a source network device for handover of the terminal device.

In a first possible implementation mode of the third aspect, the operation that the second primary network device receives the measurement result information transmitted by the terminal device may include that: the second primary network device receives the measurement result information carried in a measurement report, wherein the second primary network device may transmit the measurement result information to the first primary network device in a process of handover to the first primary network device, including that: the second primary network device transmits the measurement result information to the first primary network device through a handover request message, the handover request message being further configured to request a network device serving the terminal device to be switched from the second primary network device to the first primary network device.

In combination with the abovementioned possible implementation mode of the third aspect, in a second implementation mode of the third aspect, after the operation that the second primary network device transmits the measurement result information to the first primary network device through the handover request message, the method may further include that: the second primary network device receives configuration information, carried in an acknowledgement message of the handover request message, of the secondary connection from the first primary network device, the configuration information of the secondary connection being configured to establish the secondary connection between the secondary network device and the terminal device, and the second primary network device transmits the configuration information of the secondary connection to the terminal device.

A fourth aspect provides a method for data transmission, which may include that: a secondary network device receives a secondary connection addition request message transmitted by a first primary network device, the secondary connection addition request message being configured to request a secondary connection between the secondary network device and a terminal device to be established, and the secondary network device transmits configuration information of the secondary connection to the first primary network device according to the secondary connection addition request message, the configuration information of the secondary connection being configured to establish the secondary connection.

In a first possible implementation mode of the fourth aspect, the operation that the secondary network device transmits the configuration information of the secondary connection to the first primary network device according to the secondary connection addition request message may include that: the secondary network device transmits an acknowledgement message of the secondary connection addition request message to the first primary network device, the acknowledgement message of the secondary connection addition request message carrying the configuration information of the secondary connection.

In combination with the abovementioned possible implementation mode of the fourth aspect, in a second implementation mode of the fourth aspect, the acknowledgement message of the secondary connection addition request message may further carry identification information of at least one secondary cell, and the at least one secondary cell may be a cell served by the secondary network device.

In combination with the abovementioned possible implementation modes of the fourth aspect, in a third implementation mode of the fourth aspect, the secondary connection addition request message may carry auxiliary information, the auxiliary information may include at least one of measurement result information, access capability information of the terminal device or Quality of Service (QoS) information of data, and the measurement result information may be configured to indicate link quality information between the secondary network device and the terminal device.

In combination with the abovementioned possible implementation modes of the fourth aspect, in a fourth implementation mode of the fourth aspect, the operation that the secondary network device transmits the configuration information of the secondary connection to the first primary network device according to the secondary connection addition request message may include that: the secondary network device transmits the configuration information of the secondary connection to the first primary network device according to the auxiliary information and a load condition of the secondary network device.

A fifth aspect provides a device for data transmission, which is configured to execute the method in the first aspect or any possible implementation mode of the first aspect. Specifically, the device includes units configured to execute the method in the first aspect or any possible implementation mode of the first aspect.

A sixth aspect provides a device for data transmission, which is configured to execute the method in the second aspect or any possible implementation mode of the second aspect. Specifically, the device includes units configured to execute the method in the second aspect or any possible implementation mode of the second aspect.

A seventh aspect provides a device for data transmission, which is configured to execute the method in the third aspect or any possible implementation mode of the third aspect. Specifically, the device includes units configured to execute the method in the third aspect or any possible implementation mode of the third aspect.

An eighth aspect provides a device for data transmission, which is configured to execute the method in the fourth aspect or any possible implementation mode of the fourth aspect. Specifically, the device includes units configured to execute the method in the fourth aspect or any possible implementation mode of the fourth aspect.

A ninth aspect provides a device for data transmission, which includes a receiver, a transmitter, a memory, a processor and a bus system. The receiver, the transmitter, the memory and the processor are connected through the bus system, the memory is configured to store an instruction, the processor is configured to execute the instruction stored in the memory to control the receiver to receive signals and control the transmitter to transmit signals, and when the processor executes the instruction stored in the memory, such execution enables the processor to execute the method in the first aspect or any possible implementation mode of the first aspect.

A tenth aspect provides a device for data transmission, which includes a receiver, a transmitter, a memory, a processor and a bus system. The receiver, the transmitter, the memory and the processor are connected through the bus system, the memory is configured to store an instruction, the processor is configured to execute the instruction stored in the memory to control the receiver to receive signals and control the transmitter to transmit signals, and when the processor executes the instruction stored in the memory, such execution enables the processor to execute the method in the second aspect or any possible implementation mode of the second aspect.

An eleventh aspect provides a device for data transmission, which includes a receiver, a transmitter, a memory, a processor and a bus system. The receiver, the transmitter, the memory and the processor are connected through the bus system, the memory is configured to store an instruction, the processor is configured to execute the instruction stored in the memory to control the receiver to receive signals and control the transmitter to transmit signals, and when the processor executes the instruction stored in the memory, such execution enables the processor to execute the method in the third aspect or any possible implementation mode of the third aspect.

A twelfth aspect provides a device for data transmission, which includes a receiver, a transmitter, a memory, a processor and a bus system. The receiver, the transmitter, the memory and the processor are connected through the bus system, the memory is configured to store an instruction, the processor is configured to execute the instruction stored in the memory to control the receiver to receive signals and control the transmitter to transmit signals, and when the processor executes the instruction stored in the memory, such execution enables the processor to execute the method in the fourth aspect or any possible implementation mode of the fourth aspect.

A thirteenth aspect provides a system for data transmission, which includes the device of the fifth aspect and the device of the sixth aspect.

A fourteenth aspect provides a system for data transmission, which includes the device of the fifth aspect, the device of the sixth aspect and the device of the seventh aspect.

A fifteenth aspect provides a system for data transmission, which includes the device of the fifth aspect, the device of the sixth aspect, the device of the seventh aspect and the device of the eighth aspect.

A sixteenth aspect provides a computer-readable medium, which is configured to store a computer program, the computer program including an instruction configured to execute the method in the first aspect or any possible implementation mode of the first aspect.

A seventeenth aspect provides a computer-readable medium, which is configured to store a computer program, the computer program including an instruction configured to execute the method in the second aspect or any possible implementation mode of the second aspect.

An eighteenth aspect provides a computer-readable medium, which is configured to store a computer program, the computer program including an instruction configured to execute the method in the third aspect or any possible implementation mode of the third aspect.

A nineteenth aspect provides a computer-readable medium, which is configured to store a computer program, the computer program including an instruction configured to execute the method in the fourth aspect or any possible implementation mode of the fourth aspect.

BRIEF DESCRIPTION OF DRAWINGS

In order to describe the technical solutions of the embodiments of the disclosure more clearly, the drawings required to be used in descriptions about the embodiments or a conventional art will be simply introduced below. It is apparent that the drawings described below are only some embodiments of the disclosure. Other drawings may further be obtained by those of ordinary skill in the art according to these drawings without creative work.

DETAILED DESCRIPTION

Figure 1:
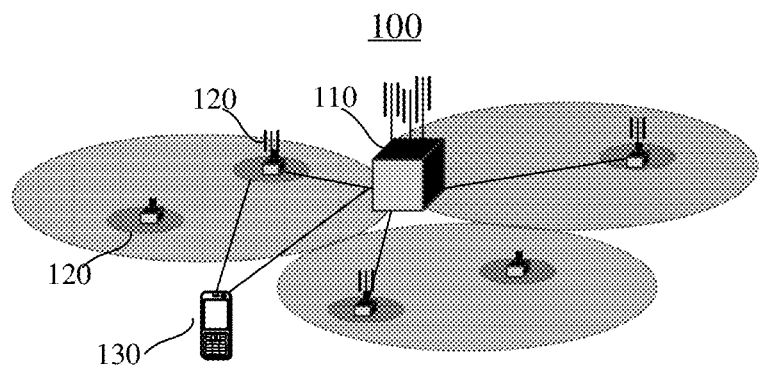
FIG. 1 illustrates a schematic diagram of an application scenario according to an embodiment of the disclosure.

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

It is to be understood that the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system and a communication system which may emerge in the future.

It is also to be understood that, in the embodiments of the disclosure, a terminal device may be called User Equipment (UE), a terminal device, a Mobile Station (MS), a mobile terminal, a terminal device in a future 5G network or the like. The terminal device may communicate with one or more core networks through a Radio Access Memory (RAN). For example, a terminal may be a mobile phone (or called a "cellular" phone) and a computer with a mobile terminal. For example, the terminal may also be a portable, pocket, handheld, computer-embedded or vehicle-mounted mobile device and performs voice and/or data exchange with the RAN.

A first network device and a second network device may be configured to communicate with a mobile device. The network device may be a Base Transceiver Station (BTS) in the GSM or CDMA, may also be a NodeB (NB) in WCDMA and may further be an Evolutional Node B (eNB or eNodeB) in LTE, or a relay station or access point, or a vehicle-mounted device, a wearable device and an access network device in the future 5G network.

A core network device may be a Mobility Management Entity (MME) and may also be a Serving Gateway (S-GW) or a Packet Data Network Gateway (P-GW). There are no limits made in the application.

A bearer is a basic unit for control of an RAN side over a capacity, delay and bit rate of a user service. A user may use multiple bearers for different services.

In the embodiments of the disclosure, the first network device and the second network device may be, for example, Macrocells, and a secondary network device may be, for example, a Microcell, a Picocell and a Femtocell. However, the embodiments of the disclosure are not limited thereto.

More specifically, a first primary network device may be an LTE network device and the secondary network device is an NR network device. It is to be understood that the embodiments of the disclosure are not limited thereto. The primary network device may also be a GSM network device, a CDMA network device and the like. The secondary network device may also be a GSM network device, a CDMA network device and the like. There are no limits made thereto in the embodiments of the disclosure.

FIG. 1 illustrates a schematic diagram of an application scenario according to the application. A network around a terminal device includes a first primary network device 110 and at least one secondary network device 120. The first primary network device 110 may belong to an LTE network and the secondary network device 120 may belong to an NR network. A terminal device 130 may establish connections with both of the first primary network device 110 and the secondary network device 120. The connection established between the terminal device 130 and the first primary network device 110 is a primary connection. The connection established between the terminal device 130 and the secondary network device 120 is a secondary connection. Control-plane data of the terminal device 130 may be transmitted through the primary connection. User-plane data of the terminal device may be transmitted through both of the primary connection and the secondary connection and may also be transmitted only through the secondary connection. In the embodiment of the disclosure, the first primary network device 110 may select the secondary network device 120 meeting a preset condition to transmit the control-plane data of the terminal device 110, so that a load of the first primary network device 110 may further be reduced. For example, the preset condition may be that link quality between the secondary network device 120 and the terminal device 130 meets a data transmission condition.

In the embodiment of the disclosure, the secondary network device 120 may be flexibly deployed according to a service requirement and a user density and its function is to assist the first primary network device 110 in sharing data. The data may include the user-plane data and control-plane data of the terminal device 130. The secondary network device 120 may be discontinuously deployed and relatively large overlapped areas between adjacent secondary cells may also be allowed. There are no limits made thereto in the embodiment of the disclosure.

Figure 2:
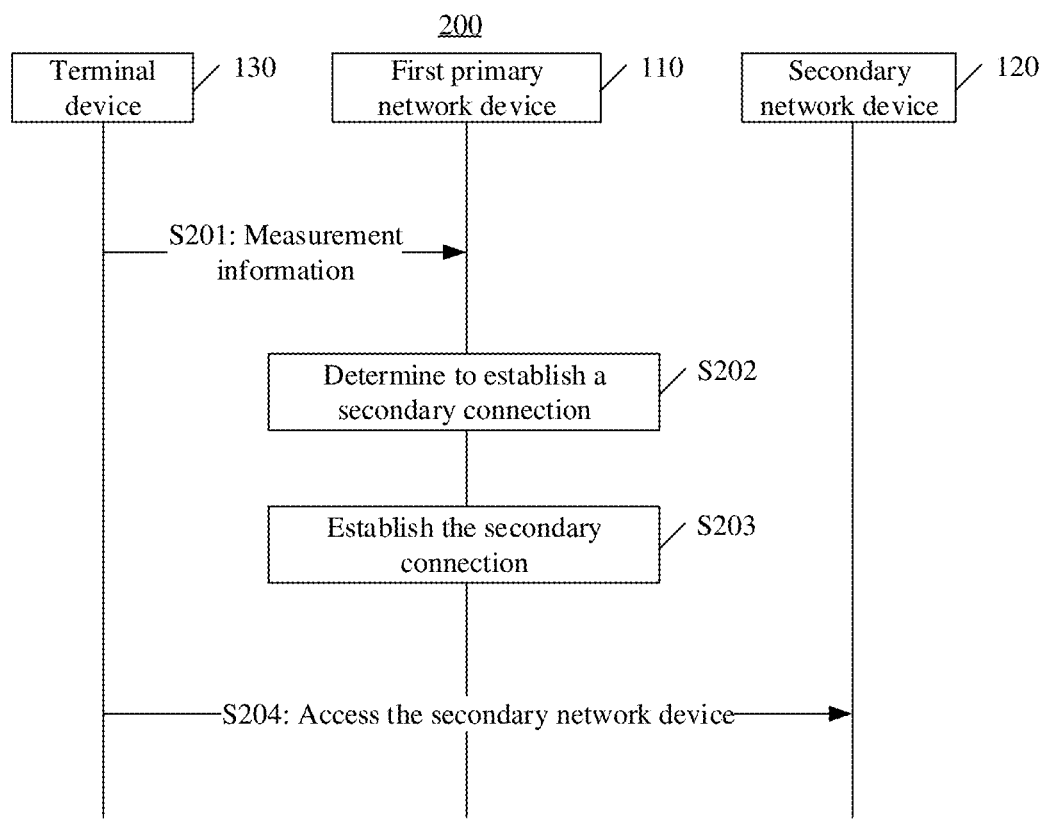
FIG. 2 illustrates a schematic diagram of a method for data transmission according to an embodiment of the disclosure.

FIG. 2 is a schematic flowchart of a method for data transmission 200 according to an embodiment of the disclosure. An execution body of the method 200 may be, for example, the first primary network device 110 in FIG. 1 and is an access network device, for example, an eNB in LTE. The method 200 includes the following steps.

In S201, a terminal device transmits measurement result information of a secondary network device to a first primary network device in a process of accessing the first primary network device, the measurement result information being configured to indicate link quality between the secondary network device and the terminal device.

It is to be understood that the process that the terminal device accesses the first primary network device may be a process that the terminal device accesses the first primary network device when data transmission is required in an idle state and may also be that a network device serving the terminal device is required to be switched from a second primary network device to the first primary network device when the terminal device is in a data connection state. The specific step of the access process, to which the process that the terminal device accesses the first primary network device refers, is not limited in the embodiment of the disclosure.

In S202, after the first primary network device receives the measurement result information of the secondary network device, transmitted by the terminal device in the process of accessing the first primary network device, the first primary network device determines to establish a secondary connection between the secondary network device and the terminal device according to the link quality between the secondary network device and the terminal device.

It is to be understood that the secondary connection is configured for data transmission and the data includes first control-plane data and/or user-plane data.

In S203, the first primary network device establishes the secondary connection.

It is to be understood that the operation that the first primary network device establishes the secondary connection may be considered as that the first primary network device receives the measurement result information transmitted by the terminal device as an intermediate device of the terminal device and the secondary network device, transmits the measurement result information to the secondary network device, receives configuration information of the secondary connection from the secondary network device, the configuration information of the secondary connection being configured to establish the secondary connection between the secondary network device and the terminal device, and transmits the configuration information of the secondary connection to the terminal device, etc. A secondary connection establishment process may be considered as an information forwarding process of the first primary network device. A terminal, after receiving the configuration information of the secondary connection, establishes the secondary connection with the secondary network device according to the configuration information of the secondary connection.

In S204, the terminal device accesses the secondary network device through configuration information of the secondary connection.

Specifically, the terminal device may transmit the measurement result information of the secondary network device to the first primary network device in the process of accessing the first primary network device, the first primary network device, after receiving the measurement result information of the terminal device, determines that the secondary connection between the secondary network device and the terminal device is required to be established according to the measurement result information, then the first primary network device establishes the secondary connection and the terminal device transmits data through the secondary connection. In such a manner, the terminal device transmits the measurement result information of the secondary network device to the first primary network device in the access process, so that the data may be offloaded to the secondary network device as soon as possible, the data may be offloaded for the first primary network device through the secondary connection established by the first primary network device as soon as possible, and a transmission load of the first primary network device may be reduced.

Alternatively, the secondary connection is configured to transmit the control-plane data and/or the user-plane data. In a conventional art, only the user-plane data is shared for the first primary network device in a data connection process. In such case, the secondary connection established by the first primary network device in the process that the terminal device accesses the first primary network device may not only offload the user-plane data for the first primary network device but also offload the control-plane data for the first primary network device. Therefore, an offloading capability of the secondary network device for the primary network device is further improved, and the transmission load of the first primary network device is reduced.

Furthermore, the secondary connection is configured to transmit the data, and the data includes the user-plane data and the control-plane data. The secondary connection established by the first primary network device may transmit the user-plane data and may also transmit first control-plane data. A connection between the first primary network device and the terminal device may be called a primary connection. The primary connection may also transmit the user-plane data and may also transmit second control-plane data. That is, the user-plane data of the terminal device may only be transmitted through the primary connection or transmitted through the secondary connection, or the user-plane data may also be transmitted through both of the primary connection and the secondary connection. The control-plane data of the terminal device may only be transmitted through the primary connection or transmitted through the secondary connection, or the control-plane data may also be transmitted through both of the primary connection and the secondary connection. A data transmission manner is not limited in the embodiment of the disclosure.

Furthermore, the data includes uplink data and downlink data. The uplink data includes uplink control-plane data and uplink user-plane data. The downlink data includes downlink control-plane data and downlink user-plane data. It can be understood that transmission in the disclosure refers to uplink transmission and/or downlink transmission.

As an alternative embodiment, the terminal device in the idle state measures the secondary network device around the first network device. Alternatively, measurement of the terminal device over the secondary network device may be measurement according to a network protocol specification and may also be measurement according to a configuration of the first primary network device. For example, a protocol specifies or the first primary network device configures that the secondary network device around the first primary network device is measured within a certain interval period. Alternatively, the terminal device may measure the secondary network device according to network configuration information in a received system message. There are no limits made thereto in the embodiment of the disclosure.

As an alternative embodiment, before the operation that the terminal device transmits the measurement result information of the secondary network device to the first primary network device in the process of accessing the first primary network device, the method further includes that: when channel quality between the terminal device and the secondary network device meets a preset condition, the terminal device transmits the measurement result information to the first primary network device in the process of accessing the first primary network device.

Specifically, the preset condition may be a specific period specified by a protocol, may also be that the terminal device detects that the channel quality with the secondary network device is higher than channel quality with the first primary network device, may also be that channel quality of the secondary network device is detected to be higher than a certain threshold value, and may also be that present reference signal power is lower than a set threshold value and the like. The terminal device may also measure in real time and report in real time, etc. A triggering condition for measurement result information reporting of the terminal device is not limited in the embodiment of the disclosure.

As an alternative embodiment, the operation that the terminal device transmits the measurement result information of the secondary network device to the first primary network device in the process of accessing the first primary network device includes that: the terminal device transmits the measurement result information to the first primary network device through an RRC connection establishment request message. The operation that the first primary network device receives the measurement result information of the secondary network device, transmitted by the terminal device in the process of accessing the primary network device, includes that: the first primary network device receives the measurement result information carried in the RRC connection establishment request message.

As an alternative embodiment, the operation that the terminal device transmits the measurement result information of the secondary network device to the first primary network device in the process of accessing the first primary network device includes that: the terminal device transmits the measurement result information to the first primary network device through an RRC connection establishment complete message, the RRC connection establishment complete message carrying the measurement result information.

The operation that the first primary network device receives the measurement result information of the secondary network device, transmitted by the terminal device in the process of accessing the primary network device, includes that: the first primary network device receives the measurement result information carried in the RRC connection establishment complete message.

Specifically, when the terminal device in the idle state has data to be transmitted, the terminal device initiates the RRC connection establishment request message to the first primary network device, and the measurement result information of the secondary network device may be carried in the RRC connection establishment request message. After RRC connection establishment is completed, the terminal device is required to transmit the RRC connection establishment complete message to the first primary network device, and the measurement result information of the secondary network device may be carried in the RRC connection establishment complete message. In such a manner, the measurement result information may be transmitted to the first primary network device in the access process.

It is to be understood that, in the embodiment of the disclosure, the terminal device may carry the measurement result information of the secondary network device in any uplink message for transmitting to the first network device. Alternatively, the measurement result information may be carried in an uplink message in the process that the terminal device accesses the first primary network device and may also be transmitted to the first network device as an independent uplink message. The embodiment of the disclosure is not limited thereto.

As an alternative embodiment, the second primary network device receives the measurement result information transmitted by the terminal device, the measurement result information being configured to indicate the link quality between the secondary network device and the terminal device. The second primary network device transmits the measurement result information to the first primary network device to enable the first primary network device to determine to establish the secondary connection between the secondary network device and the terminal device according to the measurement result information. The first network device is a target network device for handover of the terminal device and the second network device is a source network device for handover of the terminal device.

As an alternative embodiment, the operation that the terminal device transmits the measurement result information of the secondary network device to the first primary network device in the process of accessing the first primary network device includes that: the terminal device transmits the measurement result information to the first primary network device through the second primary network device, the measurement result information being carried in a measurement report transmitted to the second primary network device by the terminal device to enable the second primary network device to transmit a handover request message to the first primary network device according to the measurement report. The operation that the first primary network device receives the measurement result information of the secondary network device, transmitted by the terminal device in the process of accessing the primary network device, includes that: the first primary network device receives the measurement result information carried in the handover request message of the second primary network device, the handover request message being further configured to request the network device serving the terminal device to be switched from the second primary network device to the first primary network device.

As an alternative embodiment, the operation that the first primary network device establishes the secondary connection includes that: after the first primary network device receives the handover request message transmitted by the second primary network device, the first primary network device transmits an acknowledgement message of the handover request message to the second primary network device, the acknowledgement message of the handover request message carrying the configuration information of the secondary connection to enable the second network device to transmit the configuration information of the secondary connection to the terminal device and the configuration information of the secondary connection being configured to establish the secondary connection between the secondary network device and the terminal device; the second primary network device transmits the configuration information of the secondary connection to the terminal device; and the terminal device receives the configuration information of the secondary connection.

Specifically, when the terminal is in the data connection state, the network device serving the terminal is the second network device. The terminal device may transmit the measurement report to the second network device, the measurement report being a measurement report of the second network device. The measurement result information of the secondary network device may be carried in the measurement report. The second primary network device, when receiving the measurement report, acquires the measurement result information of the secondary network device in the measurement report. When the second primary network device determines that handover is required according to the measurement report, namely the network device serving the terminal device is switched from the second primary network device to the first primary network device, the second primary network device may determine the secondary network device around the first primary network device according to a present network topology structure and carries the measurement result information corresponding to the secondary network device around the first primary network device in the handover request message for transmitting to the first primary network device. The first primary network device, when receiving the handover request message, carries the measurement result information in the handover request message in a secondary connection addition request message for transmitting to the secondary network device around the first primary network device. The secondary network device, after receiving the secondary connection addition request message, determines whether establishment of the secondary connection is allowed or not according to the measurement result information and its own load state and, after determining to establish the secondary connection, transmits an acknowledgement message of the secondary connection addition request message to the first primary network device, the acknowledgement message of the secondary connection addition request message carrying the configuration information of the secondary connection of the secondary network device. The first primary network device carries the configuration information of the secondary connection in an acknowledgement message of the handover request message for transmitting to the second primary network device. The second primary network device transmits the configuration information of the secondary connection to the terminal device. The terminal device establishes the secondary connection with the secondary network device around the first primary network device for data transmission according to the configuration information of the secondary connection.

As an alternative embodiment, the operation that the terminal device transmits the measurement result information of the secondary network device to the first primary network device in the process of accessing the primary network device includes that: the terminal device transmits the measurement result information to the first primary network device through a handover complete message, the handover complete message being further configured to indicate that the network device serving the terminal device has been switched from the second primary network device to the first primary network device. The operation that the first primary network device receives the measurement result information of the secondary network device, transmitted by the terminal device in the process of accessing the primary network device, includes that: the first primary network device receives the measurement result information carried in the handover complete message from the terminal device.

Specifically, when the network device serving the terminal device is required to be switched from the second network device to the first network device, the measurement result information of the secondary network device may be carried in the handover complete message transmitted to the first network device by the terminal device. In such a manner, the terminal device may also establish the secondary connection in a handover process, and data transmission continuity is further ensured.

As an alternative embodiment, the secondary network device transmits the configuration information of the secondary connection to the first primary network device. S203 includes that: the first primary network device receives the configuration information of the secondary connection from the secondary network device, the configuration information of the secondary connection being configured to establish the secondary connection between the secondary network device and the terminal device; and the first primary network device transmits the configuration information of the secondary connection to the terminal device, and the terminal device receives the configuration information of the secondary connection from the first primary network device.

Alternatively, the operation that the first primary network device transmits the configuration information of the secondary connection to the terminal device includes that: the first primary network device transmits an RRC connection reconfiguration message to the terminal device, the RRC connection reconfiguration message carrying the configuration information of the secondary connection. The operation that the terminal device receives the configuration information of the secondary connection from the first primary network device includes that: the terminal device receives the RRC connection reconfiguration message transmitted by the first primary network device, the RRC connection reconfiguration message carrying the configuration information of the secondary connection.

It is to be understood that the configuration information of the secondary connection may be carried in a downlink message transmitted to the terminal device by the first primary network device. Alternatively, the configuration information of the secondary connection may be carried in a downlink message for access of the terminal device to the first primary network device and the configuration information of the secondary connection may also be independently transmitted to the terminal device. The embodiment of the disclosure is not limited thereto.

Furthermore, the configuration information of the secondary connection may be configuration information of a bearer, configuration information of a security context and the like. The embodiment of the disclosure is not limited thereto.

As an alternative embodiment, the operation that the first primary network device establishes the secondary connection includes that: the first primary network device transmits the secondary connection addition request message to the secondary network device, the secondary connection addition request message being configured to request the secondary network device to be added as a network device for data transmission; the first primary network device receives the acknowledgement message of the secondary connection addition request message from the secondary network device, the acknowledgement message of the secondary connection addition request message carrying the configuration information of the secondary connection and the configuration information of the secondary connection being configured to establish the secondary connection between the secondary network device and the terminal device; the first primary network device acquires the configuration information of the secondary connection; and the first primary network device transmits the configuration information of the secondary connection to the terminal device.

Alternatively, the secondary connection addition request message carries at least one of the measurement result information of the secondary network device, access capability information of the terminal device and QoS, so that the secondary network device may determine whether establishment of the secondary connection is allowed or not according to the information. The secondary network device, responsive to determining that establishment of the secondary connection is allowed according to the information and a present load state of the secondary network device, returns the acknowledgement message of the secondary connection addition request message to the first primary network device, the acknowledgement message carrying the configuration information of the secondary connection and the configuration information of the secondary connection being configured to establish the secondary connection. The secondary network device, responsive to determining that establishment of the secondary connection is not allowed, returns failure indication information to the first primary network device, the failure indication information carrying a cause why establishment of the secondary connection is not allowed, for example: the QoS of the secondary network device may not meet data transmission, the link quality of the secondary network device is too low and the secondary network device is presently in a congestion state. When the first primary network device receives the measurement result information of the secondary network device again, reported by the terminal device, the first primary network device may determine whether to transmit the measurement result information to the secondary network device or not according to the failure cause in the failure indication information. For example, if the failure cause of the secondary network device is network congestion, when the measurement result information of the secondary network device is received again, the measurement result information may not be transmitted to the secondary network device. Therefore, power consumption may be reduced.

As an alternative embodiment, before the operation that the first primary network device receives the measurement result information of the secondary network device, transmitted by the terminal device in the process of accessing the primary network device, the method further includes that: the first primary network device transmits first indication information to the terminal device, the first indication information being configured to instruct the terminal device to transmit the measurement result information to the first primary network device; and the terminal device receives the first indication information transmitted by the first primary network device. The operation that the first primary network device receives the measurement result information of the secondary network device, transmitted by the terminal device in the process of accessing the primary network device, further includes that: the first primary network device receives the measurement result information transmitted by the terminal device according to the first indication information.

Furthermore, the first indication information may be configured to instruct the terminal device to report the measurement result information of the secondary network device and, for example, may be a report time of the measurement result information and a manner for reporting the measurement result information. Specifically, the first indication information may instruct the terminal device to report in a manner of carrying the measurement result information in the RRC connection establishment request message, may also instruct the terminal device to report in a manner of carrying the measurement result information in the RRC connection establishment complete message, may also instruct the terminal device to report by carrying the measurement result information in the measurement report and may further instruct the terminal device to report by carrying the measurement result information in handover complete information. The embodiment of the disclosure is not limited thereto. Of course, the first indication information may also indicate a specific byte location of the specific measurement result information in the information.

Alternatively, before the operation that the first primary network device transmits the first indication information to the terminal device, the method further includes that: the terminal device may transmit third indication information to the first primary network device, and the first primary network device receives the third indication information from the terminal device, the third indication information being configured to indicate whether the terminal device stores result indication information of the secondary network device or not. Furthermore, the terminal device may carry the third indication information in an uplink message transmitted to the first primary network device. For example, if a special byte location in a certain uplink message is 0, it is indicated that the terminal device does not store measurement indication information and, if the special byte location is 1, it is indicated that the terminal device stores the measurement indication information. When receiving the third indication information transmitted by the terminal device, the first primary network device, responsive to determining that the terminal device stores the measurement result indication information, transmits the first indication information to the terminal device to instruct the terminal device to report the measurement result information.

As an alternative embodiment, the operation that the first primary network device determines to establish the secondary connection between the secondary network device and the terminal device according to the measurement result information includes that: the first primary network device determines to establish the secondary connection between the secondary network device and the terminal device according to a load condition of the first primary network device and the measurement result information.

Specifically, the first primary network device may determine whether to establish the secondary connection or not according to its own load state and the measurement result information of the secondary network device. For example, when a load of the first primary network device is relatively light, a few terminal devices access at present and the channel quality of the secondary network device is ordinary, the first primary network device may determine not to establish the secondary connection and is also not required to transmit the secondary connection addition request message to the secondary network device. When the first primary network device is in the congestion state and the channel quality of the secondary network device is higher than the channel quality of the first primary network device, the first primary network device determines that the secondary connection is required to be established and transmits the secondary connection addition request message to the secondary network device to request the secondary network device to share the load of the primary network device.

As an alternative embodiment, the acknowledgement message of the secondary connection addition request message further carries identification information of at least one secondary cell and the at least one secondary cell is a cell served by the secondary network device. After the operation that the first primary network device determines to establish the secondary connection between the secondary network device and the terminal device according to the measurement result information, the method further includes that: the first primary network device transmits the identification information of the at least one secondary cell to the terminal device, the terminal device receives the identification information of the at least one secondary cell from the first primary network device and the terminal device accesses the at least one secondary cell according to the identification information.

Specifically, the secondary network device, after receiving the secondary connection addition request message, determines whether establishment of the secondary connection is allowed or not according to the measurement result information of the secondary network device, carried in the secondary connection addition request message, and the load state of the secondary network device and, when establishment of the secondary connection is allowed, returns the acknowledgement message of the secondary connection addition request message to the first primary network device. The acknowledgement message may carry the configuration information of the secondary connection, and may further carry the identification information of the at least one secondary cell, which may be, for example, a cell identifier list. The first primary network device, after receiving the acknowledgement message of the secondary connection addition request message, transmits the identification information of the at least one secondary cell to the terminal device. The terminal device accesses the corresponding secondary cell according to the identification information of the cell.

As an alternative embodiment, after the operation that the first primary network device establishes the secondary connection, the method further includes that: the first primary network device transmits second indication information to the secondary network device, and the secondary network device receives the second indication information transmitted by the first primary network device, the second indication information being configured to instruct the secondary network device to transmit the first control-plane data.

Specifically, the first control-plane data of the terminal device may be directly transmitted through the secondary network device. The first control-plane data may also be transmitted to the secondary network device through the primary network device and transmitted to the terminal device by the secondary network device. Therefore, when the first control-plane data is required to be transmitted to the secondary network device through the primary network device and then transmitted to the terminal device, the first primary network device may transmit the second indication information to the secondary network device to instruct the secondary network device to transmit the first control-plane data. That is, the secondary network device may be notified in a network configuration manner to transmit the first control-plane data.

As an alternative embodiment, the method further includes that: the first primary network device transmits configuration information of a primary connection to the terminal device, the configuration information of the primary connection being configured for the terminal device to establish the primary connection with the first primary network device and the primary connection being configured for data transmission.

Alternatively, the data includes the first control-plane data and the second control-plane data.

Specifically, when a network side is required to transmit the control-plane data to a terminal side, the control-plane data may be transmitted through the primary connection. Then, the first primary network device is required to transmit the configuration information of the primary connection to the terminal device. If the control-plane data is transmitted through the secondary connection, the first primary network device transmits the configuration information of the secondary connection to the terminal device. If the first control-plane data is transmitted through the secondary connection and the second control-plane data is transmitted through the primary connection, the first primary network device transmits the configuration information of the secondary connection and the configuration information of the primary connection to the terminal device. The configuration information of the primary connection and the configuration information of the secondary connection may be transmitted to the terminal device simultaneously and may also be transmitted to the terminal device sequentially. The embodiment of the disclosure is not limited thereto.

As an alternative embodiment, the first primary network device is a network device in an LTE network and the secondary network device is a network device in a 5G network.

It is to be understood that the control-plane data mentioned in the embodiment of the disclosure may be, for example, RRC signaling and the user-plane data may be, for example, dedicated bearer data of a user.

Alternatively, data between an access network device of the terminal device and a core network may be directly transmitted with a core network device through the first primary network device, or is transmitted with the core network device through the first primary network device and the secondary network device respectively, or may be directly transmitted with the core network device through the secondary network device, or a part of the data is directly transmitted with the core network device through the first primary network device and the other part of the data is transmitted to the secondary network device through the first primary network device and then transmitted from the secondary network device to the terminal device. There are no limits made thereto in the embodiment of the disclosure.

The method for data transmission in the embodiments of the disclosure will be described below in combination with FIG. 3 to FIG. 6.

Figure 3:
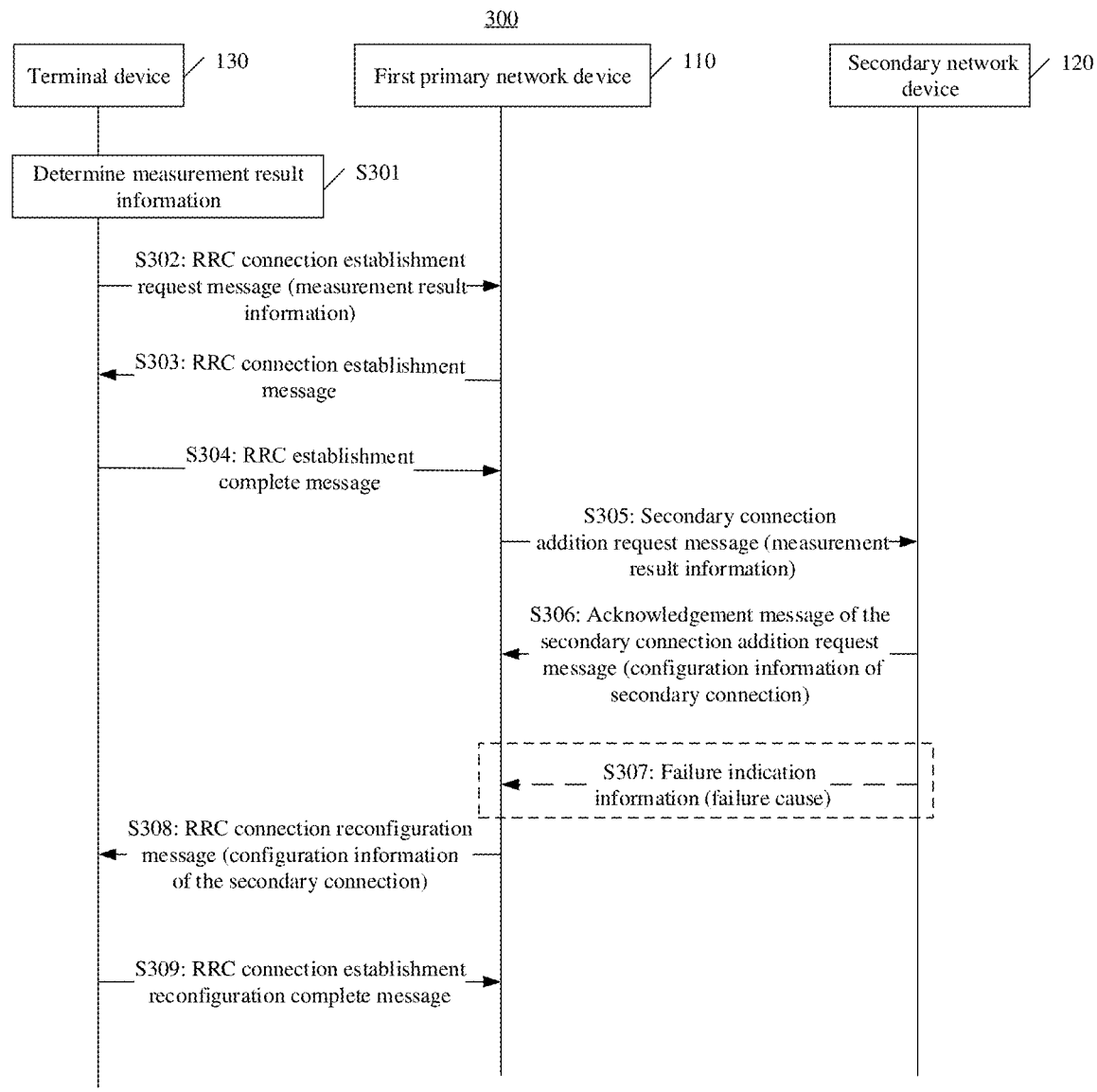
FIG. 3 illustrates another schematic diagram of a method for data transmission according to an embodiment of the disclosure.

FIG. 3 illustrates an execution process of the method for data transmission of the embodiments of the disclosure when measurement result information is carried in an RRC connection establishment request message.

In S301, a terminal device determines the measurement result information, namely executing measurement over a secondary network device.

Alternatively, the measurement result information reflects a network condition of the secondary network device. The terminal device may measure the secondary network device according to configuration information in a system message. The terminal device may also measure the secondary network device according to indication information of a first primary network device. There are no limits made thereto in the embodiment of the disclosure.

In S302, the terminal device transmits the RRC connection establishment request message to a first primary network device, the connection establishment request message carrying the measurement result information.

Alternatively, when the terminal device has a service to be transmitted, the terminal transmits the RRC connection establishment request message to the first primary network device. That the RRC connection establishment request message carries the measurement result information is only a preferred embodiment. In the embodiment of the disclosure, the measurement result information may also be reported to the first primary network device in another manner.

In S303, the first primary network device transmits an RRC connection establishment message to the terminal device.

In S304, the terminal device transmits an RRC connection establishment complete message to the first primary network device.

In S305, the first primary network device determines whether to transmit a secondary connection addition request message to the secondary network device or not according to at least one of the measurement result information of the secondary network device and a load state of the first primary network device; and the first primary network device, responsive to determining to establish a secondary connection according to at least one of the measurement result information and the load state, transmits the secondary connection addition request message to the secondary network device, the secondary connection addition request message carrying the measurement result information of the secondary network device.

It is to be understood that the terminal device may measure one or more secondary network devices. The first primary network device, after receiving the measurement result information, may transmit the secondary connection addition request message to the one or more secondary network devices. Of course, the first primary network device may also transmit the secondary connection addition request message to part of secondary network devices in multiple secondary network devices according to its own load state and the measurement result information, that is, only part of secondary network devices are required to share the present load state of the first primary network device. The embodiment of the disclosure is not limited thereto.

In S306, the secondary network device, when receiving the secondary connection addition request message transmitted by the first primary network device, determines whether establishment of the secondary connection is allowed or not according to the measurement result information in the addition request message and a network load state of the secondary network device and, when establishment of the secondary connection is allowed, returns an acknowledgement message of the secondary connection addition request message to the first primary network device, the acknowledgement message carrying configuration information of the secondary connection and the configuration information of the secondary connection being configured to establish the secondary connection.

In S307, the secondary network device, when refusing to establish the secondary connection, returns failure indication information to the first primary network device, the failure indication information carrying a cause why establishment of the secondary connection is not allowed, for example: QoS of the secondary network device may not meet data transmission, link quality of the secondary network device is too low and the secondary network device is presently in a congestion state. There are no limits made thereto in the embodiment of the disclosure.

In S308, after S306, the first primary network device, when receiving first measurement result information transmitted by the secondary network device, transmits the configuration information of the secondary connection to the terminal device. Alternatively, the configuration information of the secondary connection may be iterated in an RRC connection reconfiguration message for transmitting to the terminal device.

In S309, the terminal device transmits an RRC connection establishment reconfiguration complete message to the first primary network device, and then the terminal device may establish the secondary connection with the secondary network device according to the configuration information of the secondary connection for data transmission. The data may be control-plane data and/or user-plane data.

Figure 4:
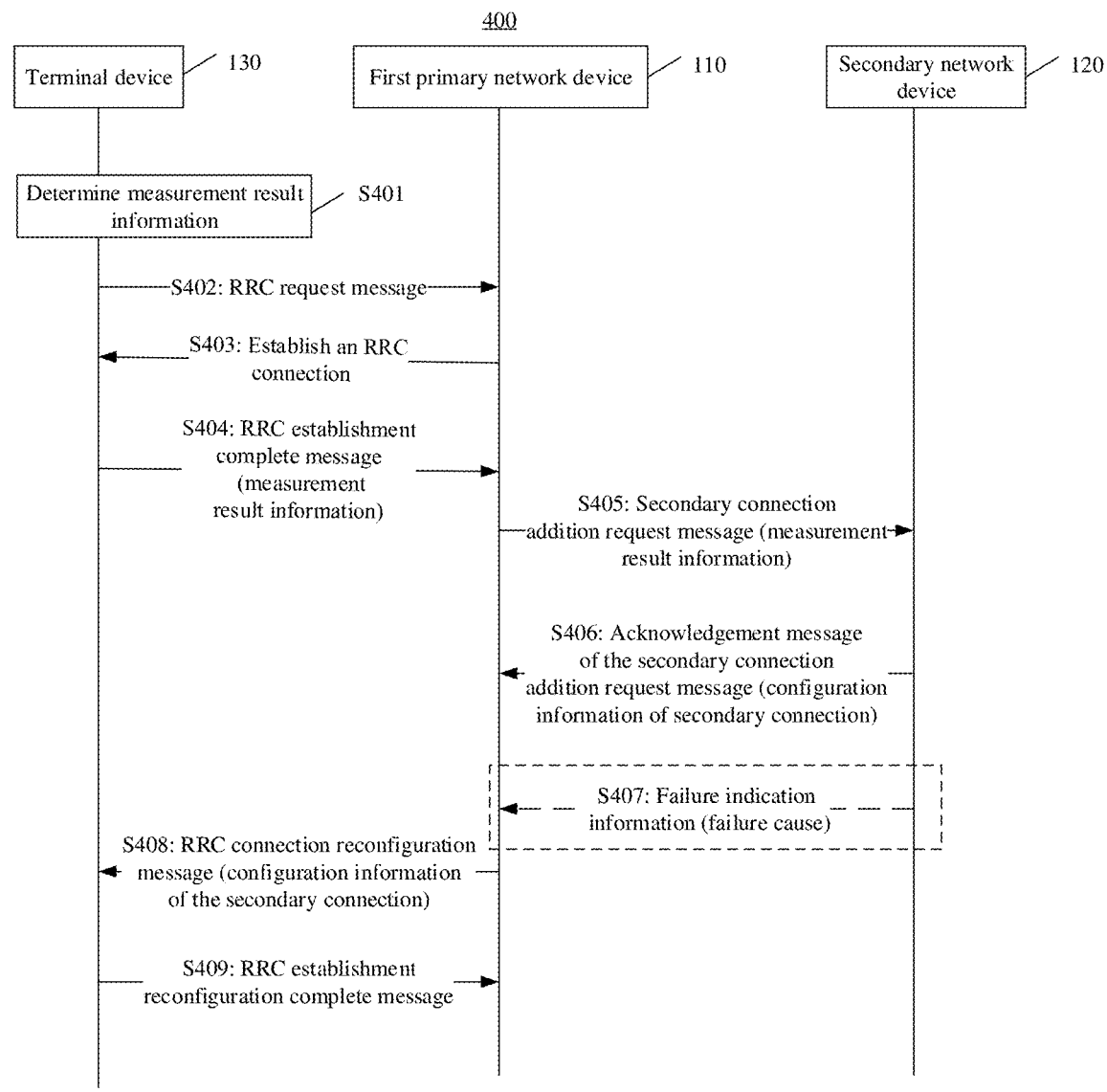
FIG. 4 illustrates another schematic diagram of a method for data transmission according to an embodiment of the disclosure.

FIG. 4 illustrates an execution process of the method for data transmission of the embodiments of the disclosure when measurement result information is carried in an RRC connection establishment complete message.

In S401, a terminal device determines the measurement result information, namely executing measurement over a secondary network device.

Alternatively, the measurement result information reflects a network condition of the secondary network device. The terminal device may measure the secondary network device according to configuration information in a system message. The terminal device may also measure the secondary network device according to indication information of a first primary network device. There are no limits made thereto in the embodiment of the disclosure.

In S402, the terminal device transmits an RRC connection establishment request message to a first primary network device.

In S403, the first primary network device transmits an RRC connection establishment message to the terminal device.

In S404, the terminal device transmits the RRC connection establishment complete message to the first primary network device, the connection establishment complete message carrying the measurement result information of the secondary network device.

Alternatively, the RRC connection establishment complete message carrying the measurement result information is only a preferred embodiment. In the embodiment of the disclosure, the measurement result information may also be reported to the first primary network device in another manner.

It is to be understood that an execution sequence of S401, S402 and S403 is not limited as long as S401 is executed before S404.

In S405, the first primary network device determines whether to transmit a secondary connection addition request message to the secondary network device or not according to at least one of the measurement result information of the secondary network device and a load state of the first primary network device; and the first primary network device, responsive to determining to establish a secondary connection according to at least one of the measurement result information and the load state, transmits the secondary connection addition request message to the secondary network device, the secondary connection addition request message carrying the measurement result information of the secondary network device.

In S406, the secondary network device, when receiving the secondary connection addition request message transmitted by the first primary network device, determines whether establishment of the secondary connection is allowed or not according to the measurement result information in the addition request message and a network load state of the secondary network device and, when establishment of the secondary connection is allowed, returns an acknowledgement message of the secondary connection addition request message to the first primary network device, the acknowledgement message carrying configuration information of the secondary connection and the configuration information of the secondary connection being configured to establish the secondary connection.

In S407, the secondary network device, when refusing to establish the secondary connection, returns failure indication information to the first primary network device, the failure indication information carrying a cause why establishment of the secondary connection is not allowed, for example: QoS of the secondary network device may not meet data transmission, link quality of the secondary network device is too low and the secondary network device is presently in a congestion state.

In S408, after S406, the first primary network device, when receiving first measurement result information transmitted by the secondary network device, transmits the configuration information of the secondary connection to the terminal device. Alternatively, the configuration information of the secondary connection may be iterated in an RRC connection reconfiguration message for transmitting to the terminal device.

In S409, the terminal device transmits an RRC connection establishment reconfiguration complete message to the first primary network device, and then the terminal device may establish the secondary connection with the secondary network device according to the configuration information of the secondary connection for data transmission. The data may be control-plane data and/or user-plane data.

Figure 5:
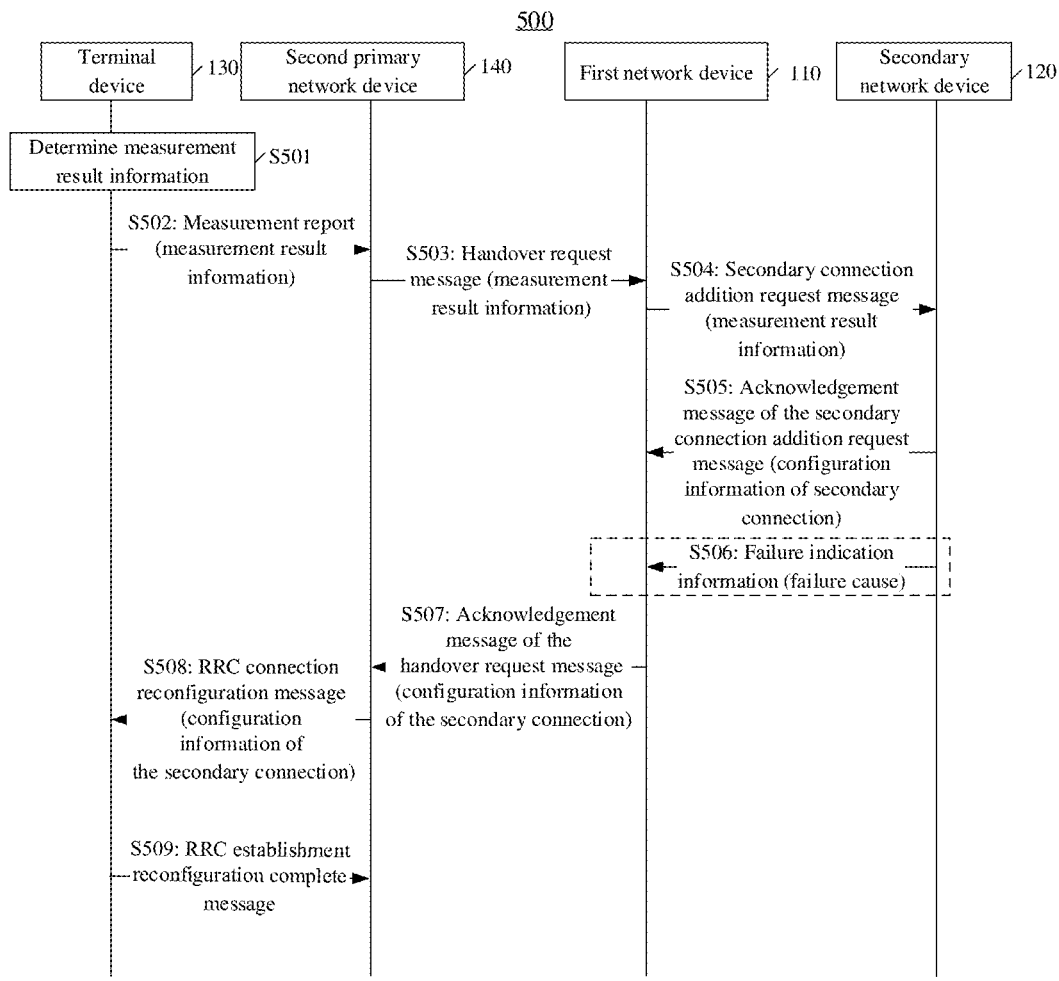
FIG. 5 illustrates another schematic diagram of a method for data transmission according to an embodiment of the disclosure.
Figure 6:
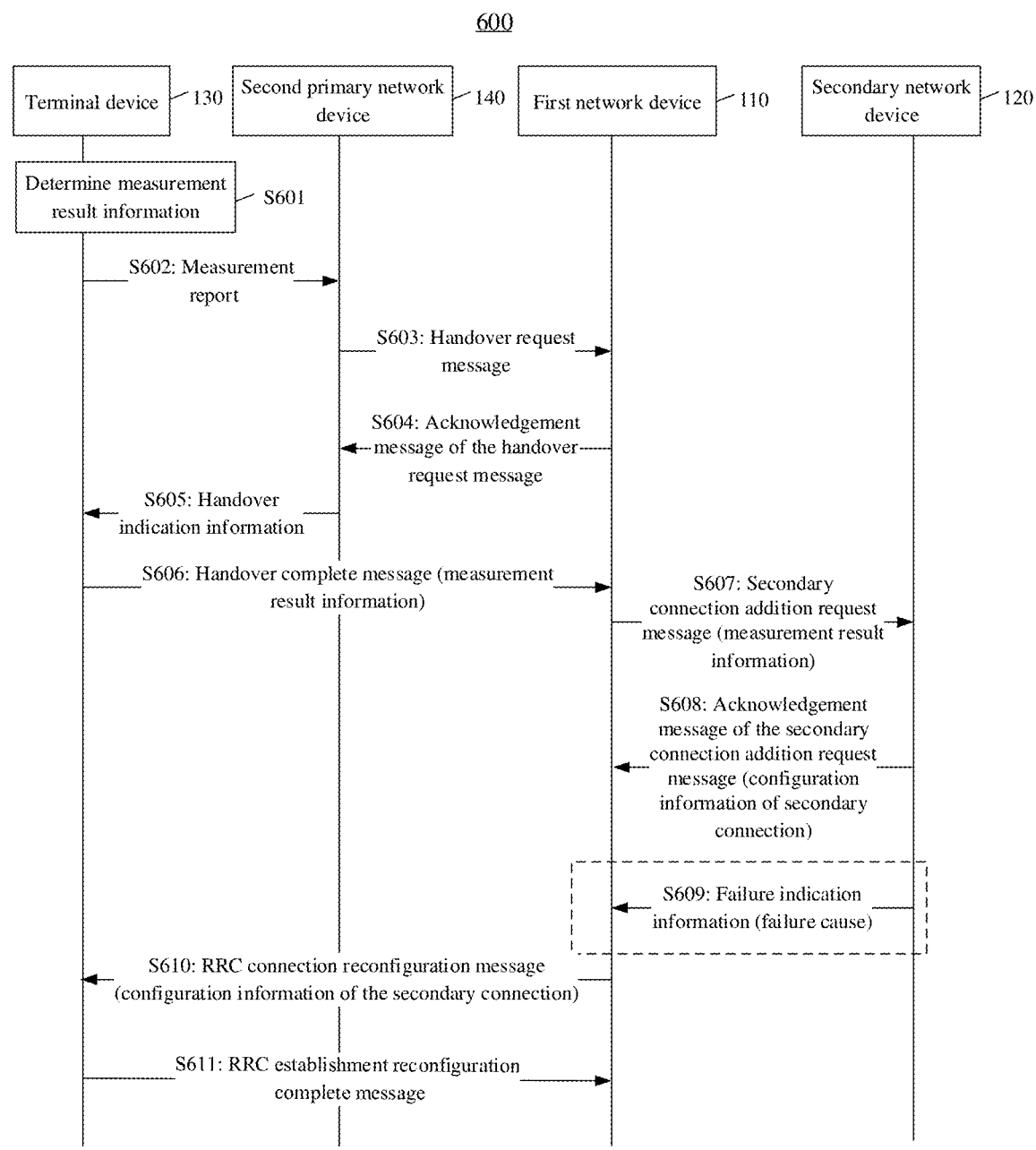
FIG. 6 illustrates another schematic diagram of a method for data transmission according to an embodiment of the disclosure.

FIG. 5 and FIG. 6 illustrate method for data transmissions in a handover scenario according to the embodiments of the disclosure.

FIG. 5 illustrates an execution process of the method for data transmission of the embodiments of the disclosure when measurement result information is carried in a handover request message.

In S501, a terminal device determines the measurement result information, namely executing measurement over a secondary network device.

Alternatively, the measurement result information reflects a network condition of the secondary network device. The terminal device may measure the secondary network device according to configuration information in a system message. The terminal device may also measure the secondary network device according to indication information of a first primary network device. There are no limits made thereto in the embodiment of the disclosure.

It is to be understood that the secondary network device measured by the terminal device in a handover process may be a secondary network device of the first primary network device 110, may also be a secondary network device of a second primary network device 140 and may further be a secondary network device of another primary network device. The embodiment of the disclosure is not limited thereto.

In S502, the terminal device, when transmitting a measurement report to a second primary network device 140, carries the measurement result information of the secondary network device in the measurement report for transmitting to the second primary network device 140, the measurement report being a measurement report generated in a data transmission process of the terminal device and the second primary network device.

In S503, the second primary network device 140, when receiving the measurement report transmitted by the terminal, determines whether to perform handover or not according to present communication quality information represented by the measurement report and, when handover is required, carries the measurement result information in the measurement report in the handover request message for transmitting to the first primary network device.

It is to be understood that the second network device may determine the secondary network device of the first primary network device according to a present network topology structure and transmit the measurement result information corresponding to the secondary network device of the first primary network device to the first primary network device.

In S504, the first primary network device, when receiving the handover request message, determines whether a secondary connection is required to be established or not according to the measurement result information carried in the handover request message and its own network state and, if the secondary connection is required to be established, transmits a secondary connection addition request message to the secondary network device, the secondary connection addition request message carrying the measurement result information of the secondary network device.

In S505, the secondary network device, when receiving the secondary connection addition request message transmitted by the first primary network device, determines whether establishment of the secondary connection is allowed or not according to the measurement result information in the addition request message and a network load state of the secondary network device and, when establishment of the secondary connection is allowed, returns an acknowledgement message of the secondary connection addition request message to the first primary network device, the acknowledgement message carrying configuration information of the secondary connection and the configuration information of the secondary connection being configured to establish the secondary connection.

In S506, the secondary network device, when refusing to establish the secondary connection, returns failure indication information to the first primary network device, the failure indication information carrying a cause why establishment of the secondary connection is not allowed, for example: QoS of the secondary network device may not meet data transmission, link quality of the secondary network device is too low and the secondary network device is presently in a congestion state.

In S507, after S505, the first primary network device transmits an acknowledgement message of the handover request message to the second primary network device, the acknowledgement message carrying the configuration information of the secondary connection.

In S508, the second primary network device, after receiving the acknowledgement message of the handover request message, transmits the configuration information of the secondary connection to the terminal device. Alternatively, the configuration information of the secondary connection may be carried in an RRC connection reconfiguration message for transmitting to the terminal device.

In S509, the terminal device transmits an RRC connection establishment reconfiguration complete message to the first primary network device, and then the terminal device may establish the secondary connection with the secondary network device according to the configuration information of the secondary connection for data transmission. The data may be control-plane data and/or user-plane data.

FIG. 6 illustrates an execution process of the method for data transmission of the embodiments of the disclosure when measurement result information is carried in a handover complete message.

In S601, a terminal device determines the measurement result information, namely executing measurement over a secondary network device.

Alternatively, the measurement result information reflects a network condition of the secondary network device. The terminal device may measure the secondary network device according to configuration information in a system message. The terminal device may also measure the secondary network device according to indication information of a first primary network device. There are no limits made thereto in the embodiment of the disclosure.

It is to be understood that the secondary network device measured by the terminal device in a handover process may be a secondary network device of the first primary network device 110, may also be a secondary network device of a second primary network device 140 and may further be a secondary network device of another primary network device. The embodiment of the disclosure is not limited thereto.

In S602, the terminal device transmits a measurement report to a second primary network device 140, the measurement report being a measurement report generated in a data transmission process of the terminal device and the second primary network device.

In S603, the second primary network device 140, when receiving the measurement report transmitted by the terminal, determines whether to perform handover or not according to present communication quality information represented by the measurement report and, when handover is required, the second primary network device transmits a handover request message to a first primary network device.

It is to be understood that the second network device may determine the secondary network device of the first primary network device according to a present network topology structure and transmit the measurement result information corresponding to the secondary network device of the first primary network device to the first primary network device.

In S604, the first primary network device, responsive to determining that handover may be performed, transmits an acknowledgement message of the handover request message to the second primary network device.

In S605, the second primary network device transmits handover indication information to the terminal device, the handover indication information being configured to instruct the terminal device to access the first network device. That is, the second primary network device may be considered as a source network device and the first primary network device may be considered as a target network device.

In S606, the terminal device transmits the handover complete message to the first primary network device, the handover complete message carrying the measurement result information of the secondary network device.

It is to be understood that a sequence of S601, S602, S603, S604 and S605 is not limited as long as S601 is executed before S606.

In S607, the first primary network device, after receiving the handover complete message, determines whether to establish a secondary connection or not according to the measurement result information carried in the handover complete message and a present load state of the first primary network device and, responsive to determining that the secondary connection is required to be established, transmits the respectively corresponding measurement result information to the secondary network device of the first primary network device according to a present network topology structure, the measurement result information being carried in a secondary connection addition request message for transmitting to the secondary network device.

In S608, the secondary network device, when receiving the secondary connection addition request message transmitted by the first primary network device, determines whether establishment of the secondary connection is allowed or not according to the measurement result information in the addition request message and a network load state of the secondary network device and, when establishment of the secondary connection is allowed, returns an acknowledgement message of the secondary connection addition request message to the first primary network device, the acknowledgement message carrying configuration information of the secondary connection and the configuration information of the secondary connection being configured to establish the secondary connection.

In S609, the secondary network device, when refusing to establish the secondary connection, returns failure indication information to the first primary network device, the failure indication information carrying a cause why establishment of the secondary connection is not allowed, for example: QoS of the secondary network device may not meet data transmission, link quality of the secondary network device is too low and the secondary network device is presently in a congestion state.

In S610, after S608, the first primary network device transmits an RRC connection reconfiguration message to the terminal device, the RRC connection reconfiguration message carrying the configuration information of the secondary connection.

In S611, the terminal device transmits an RRC connection establishment reconfiguration complete message to the first primary network device, and then the terminal device may establish the secondary connection with the secondary network device according to the configuration information of the secondary connection for data transmission. The data may be control-plane data and/or user-plane data.

Figure 7:
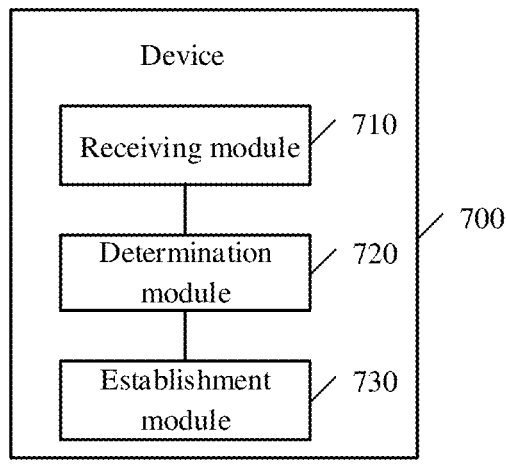
FIG. 7 illustrates a schematic block diagram of a device for data transmission according to an embodiment of the disclosure.

FIG. 7 illustrates a schematic diagram of a device for data transmission 700 according to an embodiment of the disclosure. The device may be, for example, a first primary network device. The device 700 includes a receiving module 710, a determination module 720 and an establishment module 730.

The receiving module 710 is configured to receive measurement result information of a secondary network device, transmitted by a terminal device in a process of accessing the first primary network device, the measurement result information being configured to indicate link quality between the secondary network device and the terminal device.

The determination module 720 is configured to determine to establish a secondary connection between the secondary network device and the terminal device according to the link quality between the secondary network device and the terminal device.

The establishment module 730 is configured to establish the secondary connection.

As an alternative embodiment, the receiving module 710 is specifically configured to receive the measurement result information carried in an RRC connection establishment request message or an RRC connection establishment complete message.

As an alternative embodiment, the receiving module 710 is specifically configured to receive the measurement result information carried in a handover complete message from the terminal device, the handover complete message being further configured to indicate that a network device serving the terminal device has been switched from a second network device to the device 700.

As an alternative embodiment, the receiving module 710 is specifically configured to receive the measurement result information carried in a handover request message of the second primary network device, the handover request message being further configured to request the network device serving the terminal device to be switched from the second primary network device to the first primary network device.

As an alternative embodiment, the establishment module 730 is specifically configured to, after the handover request message transmitted by the second primary network device is received, transmit an acknowledgement message of the handover request message to the second primary network device, the acknowledgement message of the handover request message carrying configuration information of the secondary connection to enable the second network device to transmit the configuration information of the secondary connection to the terminal device and the configuration information of the secondary connection being configured to establish the secondary connection between the secondary network device and the terminal device.

Alternatively, the establishment module 730 may include a transmitting unit, configured to transmit the acknowledgement message of the handover request message to the second primary network device.

As an alternative embodiment, the device 700 further includes: a first transmitting module, configured to, before the measurement result information of the secondary network device, transmitted by the terminal device in the process of accessing the primary network device, is received, transmit first indication information to the terminal device, the first indication information being configured to instruct the terminal device to transmit the measurement result information to the first primary network device. The receiving module 710 is specifically configured to receive the measurement result information transmitted by the terminal device according to the first indication information.

As an alternative embodiment, the establishment module 730 is specifically configured to transmit a secondary connection addition request message to the secondary network device, the secondary connection addition request message being configured to request the secondary network device to be added as a network device for data transmission; receive an acknowledgement message of the secondary connection addition request message from the secondary network device, the acknowledgement message of the secondary connection addition request message carrying the configuration information of the secondary connection and the configuration information of the secondary connection being configured to establish the secondary connection between the secondary network device and the terminal device; acquire the configuration information of the secondary connection; and transmit the configuration information of the secondary connection to the terminal device.

Alternatively, the establishment module 730 may include a transmitting unit, a receiving unit, an acquisition unit and the transmitting unit. The transmitting unit is configured to transmit the secondary connection addition request message to the secondary network device. The receiving unit is configured to receive the acknowledgement message of the secondary connection addition request message from the secondary network device. The acquisition unit is configured to acquire the configuration information of the secondary connection. The transmitting unit is configured to transmit the configuration information of the secondary connection to the terminal device.

As an alternative embodiment, the determination module 720 is specifically configured to determine to establish the secondary connection between the secondary network device and the terminal device according to a load condition of the first primary network device and the measurement result information.

As an alternative embodiment, the device 700 further includes: a second transmitting module, configured to transmit configuration information of a primary connection to the terminal device, the configuration information of the primary connection being configured for the terminal device to establish the primary connection with the device 700 and the primary connection being configured for data transmission.

As an alternative embodiment, the device 700 is a network device in an LTE network and the secondary network device is a network device in a 5G network.

As an alternative embodiment, the secondary connection is configured to transmit first control-plane data and/or user-plane data.

It is to be understood that the device 700 described herein is embodied in form of functional module. Term "module" mentioned herein may refer to an Application Specific Integrated Circuit (ASIC), an electronic circuit, a processor (for example, a shared processor, a dedicated processor or a group processor) and memory configured to execute one or more software or firmware programs, a merged logic circuit and/or another proper component supporting the described functions. In an alternative example, those skilled in the art may know that the device 700 may specifically be the first primary network device in the abovementioned embodiments and the device 700 may be configured to execute each flow and/or step corresponding to the first primary network device in the abovementioned method embodiments, which will not be elaborated herein for avoiding repetitions.

Figure 8:
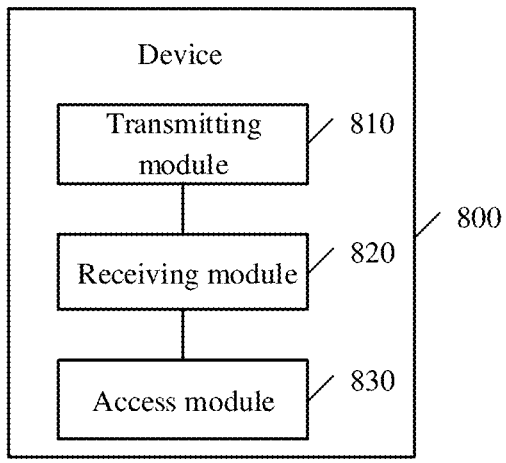
FIG. 8 illustrates another schematic block diagram of a device for data transmission according to an embodiment of the disclosure.

FIG. 8 illustrates a schematic diagram of a device for data transmission 800 according to an embodiment of the disclosure. For example, the device may be a terminal device. The device 800 includes a transmitting module 810, a receiving module 820 and an access module 830.

The transmitting module 810 is configured for the device 800 to transmit measurement result information of a secondary network device to a first primary network device in a process of accessing the first primary network device to enable the first primary network device to acquire configuration information of a secondary connection according to the measurement result information, the measurement result information being configured to indicate link quality between the secondary network device and the device 800.

The receiving module 820 is configured to receive the configuration information of the secondary connection from the first primary network device, the configuration information of the secondary connection being configured to establish the secondary connection between the secondary network device and the device 800.

The access module 830 is configured to access the secondary network device according to the configuration information of the secondary connection.

As an alternative embodiment, the transmitting module 810 is specifically configured to transmit the measurement result information to the first primary network device through an RRC connection establishment request message or an RRC connection establishment complete message.

As an alternative embodiment, the transmitting module 810 is specifically configured to transmit the measurement result information to the first primary network device through a second primary network device, the measurement result information being carried in a measurement report transmitted to the second primary network device by the device 800 to enable the second primary network device to transmit a handover request message to the first primary network device according to the measurement report, the handover request message carrying the measurement result information and the handover request message being further configured to request a network device serving the device 800 to be switched from the second primary network device to the first primary network device.

As an alternative embodiment, the transmitting module 810 is specifically configured to transmit the measurement result information to the first primary network device through a handover complete message, the handover complete message being further configured to indicate that a network device serving the device 800 has been switched from the second network device to the first network device.

As an alternative embodiment, the receiving module 820 is further configured to, before the device 800 transmits the measurement result information of the secondary network device to the first primary network device in the process of accessing the first primary network device, receive first indication information transmitted by the first primary network device, the first indication information being configured to indicate the device 800 to transmit the measurement result information to the first primary network device. The transmitting module 810 is specifically configured to transmit the measurement result information to the first primary network device in the process of accessing the first primary network device according to the first indication information.

As an alternative embodiment, the transmitting module 810 is specifically configured for the device 800 to, before the device 800 transmits the measurement result information of the secondary network device to the first primary network device in the process of accessing the first primary network device, when channel quality between the device 800 and the secondary network device meets a preset condition, transmit the measurement result information to the first primary network device in the process of accessing the first primary network device.

As an alternative embodiment, the receiving module 820 is further configured to receive configuration information of a primary connection from the first primary network device, the configuration information of the primary connection being configured for the device 800 to establish the primary connection with the first primary network device and the primary connection being configured for data transmission.

It is to be understood that the device 800 described herein is embodied in form of functional module. Term "module"

mentioned herein may refer to an ASIC, an electronic circuit, a processor (for example, a shared processor, a dedicated processor or a group processor) and memory configured to execute one or more software or firmware programs, a merged logic circuit and/or another proper component supporting the described functions. In an alternative example, those skilled in the art may know that the device 800 may specifically be the terminal device in the abovementioned embodiments and the device 800 may be configured to execute each flow and/or step corresponding to the terminal device in the abovementioned method embodiments, which will not be elaborated herein for avoiding repetitions.

Figure 9:
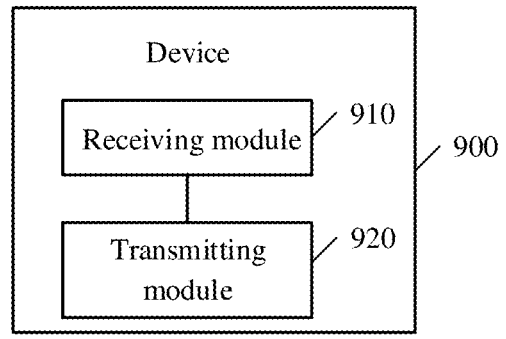
FIG. 9 illustrates another schematic block diagram of a device for data transmission according to an embodiment of the disclosure.

FIG. 9 illustrates a schematic diagram of a device for data transmission 900 according to an embodiment of the disclosure. For example, the device may be a second primary network device. The device 900 includes a receiving module 910 and a transmitting module 920.

The receiving module 910 is configured to receive measurement result information transmitted by a terminal device, the measurement result information being configured to indicate link quality between a secondary network device and the terminal device.

The transmitting module 920 is configured to transmit the measurement result information to a first primary network device to enable the first primary network device to determine to establish a secondary connection between the secondary network device and the terminal device according to the measurement result information, the first network device being a target network device for handover of the terminal device and the device being a source network device for handover of the terminal device.

As an alternative embodiment, the receiving module 910 is specifically configured to receive the measurement result information carried in a measurement report. The transmitting module 920 is specifically configured to transmit the measurement result information to the first primary network device through a handover request message, the handover request message being further configured to request a network device serving the terminal device to be switched from the device to the first primary network device.

As an alternative embodiment, the receiving module 910 is further configured to, after the device transmits the measurement result information to the first primary network device through the handover request message, receive configuration information, carried in an acknowledgement message of the handover request message, of the secondary connection from the first primary network device, the configuration information of the secondary connection being configured to establish the secondary connection between the secondary network device and the terminal device. The transmitting module 920 is further configured to transmit the configuration information of the secondary connection to the terminal device.

It is to be understood that the device 900 described herein is embodied in form of functional module. Term "module" mentioned herein may refer to an ASIC, an electronic circuit, a processor (for example, a shared processor, a dedicated processor or a group processor) and memory configured to execute one or more software or firmware programs, a merged logic circuit and/or another proper component supporting the described functions. In an optional example, those skilled in the art may know that the device 900 may specifically be the second primary network device in the abovementioned embodiments and the device 900 may be configured to execute each flow and/or step corresponding to the second primary network device in the abovementioned method embodiments, which will not be elaborated herein for avoiding repetitions.

Figure 10:
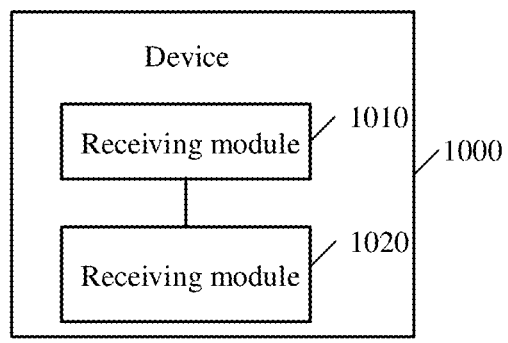
FIG. 10 illustrates another schematic block diagram of a device for data transmission according to an embodiment of the disclosure.

FIG. 10 illustrates a schematic diagram of a device for data transmission 1000 according to an embodiment of the disclosure. For example, the device may be a secondary network device. The device 1000 includes a receiving module 1010 and a transmitting module 1020.

The receiving module 1010 is configured to receive a secondary connection addition request message transmitted by a first primary network device, the secondary connection addition request message being configured to request a secondary connection between the secondary network device and a terminal device to be established, the secondary connection being configured for data transmission and the data including first control-plane data and user-plane data.

The transmitting module 1020 is configured to transmit configuration information of the secondary connection to the first primary network device according to the secondary connection addition request message, the configuration information of the secondary connection being configured to establish the secondary connection.

As an alternative embodiment, the transmitting module 1020 is specifically configured for the secondary network device to transmit an acknowledgement message of the secondary connection addition request message to the first primary network device, the acknowledgement message of the secondary connection addition request message carrying the configuration information of the secondary connection.

As an alternative embodiment, the acknowledgement message of the secondary connection addition request message further carries identification information of at least one secondary cell, and the at least one secondary cell is a cell served by the secondary network device.

As an alternative embodiment, the secondary connection addition request message carries auxiliary information, the auxiliary information includes at least one of measurement result information, access capability information of the terminal device and QoS information of the data, and the measurement result information is configured to indicate link quality information between the secondary network device and the terminal device.

As an alternative embodiment, the operation that the secondary network device transmits the configuration information of the secondary connection to the first primary network device according to the secondary connection addition request message includes that: the secondary network device transmits the configuration information of the secondary connection to the first primary network device according to the auxiliary information and a load condition of the secondary network device.

It is to be understood that the device 1000 described herein is embodied in form of functional module. Term "module" mentioned herein may refer to an ASIC, an electronic circuit, a processor (for example, a shared processor, a dedicated processor or a group processor) and memory configured to execute one or more software or firmware programs, a merged logic circuit and/or another proper component supporting the described functions. In an alternative example, those skilled in the art may know that the device 1000 may specifically be the secondary network device in the abovementioned embodiments and the device 1000 may be configured to execute each flow and/or step corresponding to the secondary network device in the abovementioned method embodiments, which will not be elaborated herein for avoiding repetitions.

Figure 11:
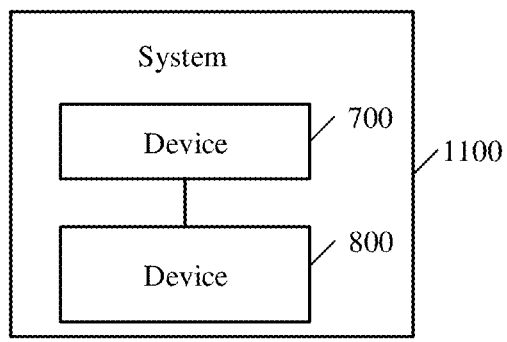
FIG. 11 illustrates a schematic block diagram of a system for data transmission according to an embodiment of the disclosure.

FIG. 11 is a schematic structure diagram of a system for data transmission 1100 according to an embodiment of the disclosure. The communication system 1100 includes a device 700 and a device 800.

Figure 12:
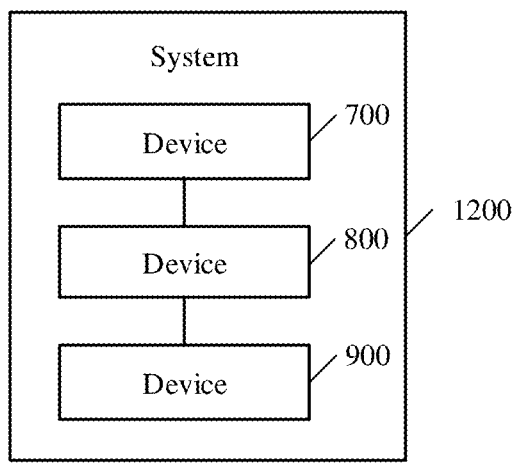
FIG. 12 illustrates a schematic block diagram of a system for data transmission according to an embodiment of the disclosure.

FIG. 12 is a schematic structure diagram of a system for data transmission 1200 according to an embodiment of the disclosure. The communication system 1200 includes a device 700, a device 800 and a device 900.

Figure 13:
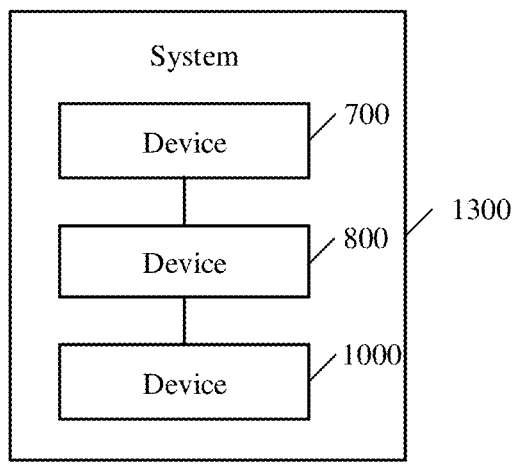
FIG. 13 illustrates a schematic block diagram of a system for data transmission according to an embodiment of the disclosure.

FIG. 13 is a schematic structure diagram of a system for data transmission 1300 according to an embodiment of the disclosure. The communication system 1300 includes a device 700, a device 800 and a device 1000.

Figure 14:
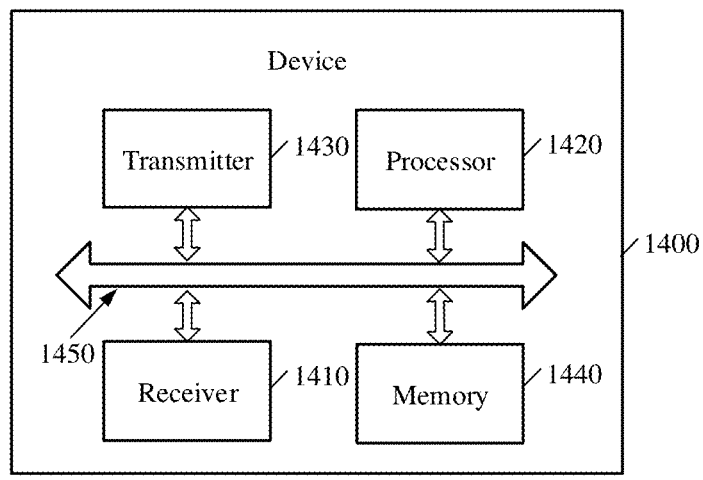
FIG. 14 illustrates a schematic block diagram of a device for data transmission according to an embodiment of the disclosure.

FIG. 14 illustrates a device for data transmission 1400 according to an embodiment of the disclosure. The device 1400 includes a receiver 1410, a processor 1420, a sender 1430, a memory 1440 and a bus system 1450. The receiver 1410, the processor 1420, the sender 1430 and the memory 1440 are connected through the bus system 1450. The memory 1440 is configured to store an instruction. The processor 1420 is configured to execute the instruction stored in the memory 1440 to control the receiver 1410 to receive a signal and control the sender 1430 to transmit an instruction.

The receiver 1410 is configured to receive measurement result information of a secondary network device, transmitted by a terminal device in a process of accessing the first primary network device, the measurement result information being configured to indicate link quality between the secondary network device and the terminal device. The processor 1420 is configured to determine to establish a secondary connection between the secondary network device and the terminal device according to the link quality between the secondary network device and the terminal device. The processor 1420 is configured to establish the secondary connection.

It is to be understood that the device 1400 may specifically be the first primary network device in the abovementioned embodiments and may be configured to execute each step and/or flow corresponding to the first primary device in the abovementioned method embodiments. Alternatively, the memory 1440 may include a Read-Only Memory (ROM) and a Random Access Memory (RAM) and provides an instruction and data for the processor. A part of the memory may further include a nonvolatile RAM. For example, the memory may further store information of a device type. The processor 1420 may be configured to execute the instruction stored in the memory. When the processor executes the instruction, the processor may execute each step corresponding to the first primary network device in the abovementioned method embodiments.

Figure 15:
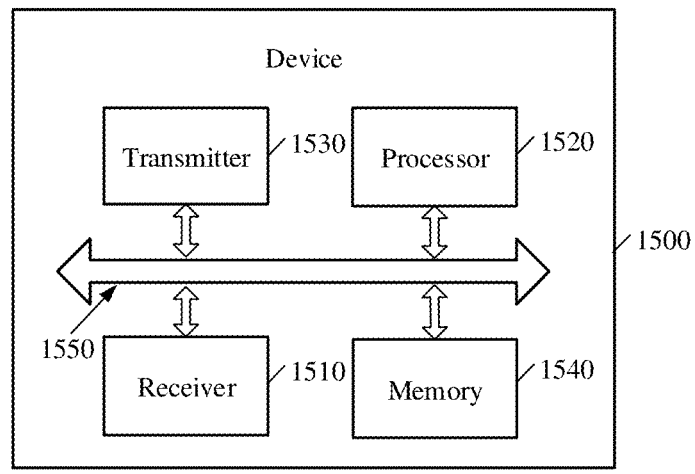
FIG. 15 illustrates another schematic block diagram of a device for data transmission according to an embodiment of the disclosure.

FIG. 15 illustrates a device for data transmission 1500 according to an embodiment of the disclosure. The device 1500 includes a receiver 1510, a processor 1520, a sender 1530, a memory 1540 and a bus system 1550. The receiver 1510, the processor 1520, the sender 1530 and the memory 1540 are connected through the bus system 1550. The memory 1540 is configured to store an instruction. The processor 1520 is configured to execute the instruction stored in the memory 1540 to control the receiver 1510 to receive a signal and control the sender 1530 to send an instruction.

The sender 1530 is configured for the device to transmit measurement result information of a secondary network device to a first primary network device in a process of accessing the first primary network device to enable the first primary network device to acquire configuration information of a secondary connection according to the measurement result information, the measurement result information being configured to indicate link quality between the secondary network device and the device. The receiver 1510 is configured to receive the configuration information of the secondary connection from the first primary network device. The processor 1520 is configured to access the secondary network device according to the configuration information of the secondary connection.

It is to be understood that the device 1500 may specifically be the terminal device in the abovementioned embodiments and may be configured to execute each step and/or flow corresponding to the terminal device in the abovementioned method embodiments. Alternatively, the memory 1540 may include a ROM and a RAM and provides an instruction and data for the processor. A part of the memory may further include a nonvolatile RAM. For example, the memory may further store information of a device type. The processor 1520 may be configured to execute the instruction stored in the memory, and when the processor executes the instruction, the processor may execute each step corresponding to the terminal device in the abovementioned method embodiments.

Figure 16:
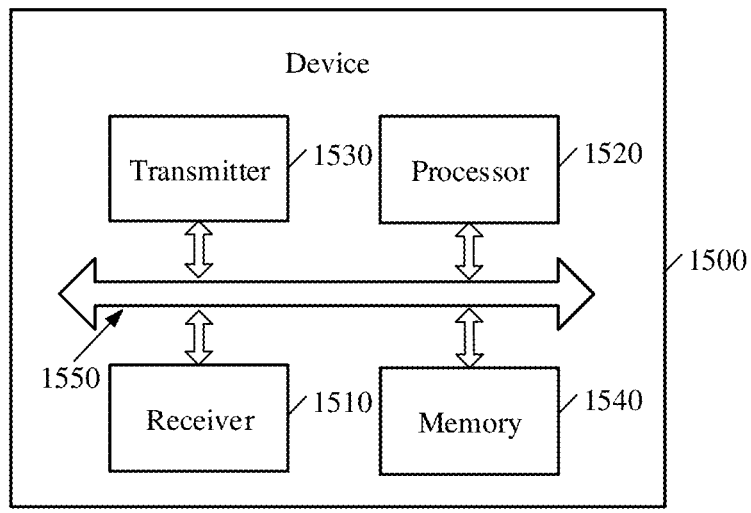
FIG. 16 illustrates another schematic block diagram of a device for data transmission according to an embodiment of the disclosure.

FIG. 16 illustrates a device for data transmission 1600 according to an embodiment of the disclosure. The device 1600 includes a receiver 1610, a processor 1620, a sender 1630, a memory 1640 and a bus system 1650. The receiver 1610, the processor 1620, the sender 1630 and the memory 1640 are connected through the bus system 1650. The memory 1640 is configured to store an instruction. The processor 1620 is configured to execute the instruction stored in the memory 1640 to control the receiver 1610 to receive a signal and control the sender 1630 to send an instruction.

The receiver 1610 is configured to receive measurement result information sent by a terminal device, the measurement result information being configured to indicate link quality between a secondary network device and the terminal device. The sender 1630 is configured for the device 1600 to send the measurement result information to a first primary network device in a process of handover to the first primary network device to enable the first primary network device to determine to establish a secondary connection between the secondary network device and the terminal device according to the measurement result information.

It is to be understood that the device 1600 may specifically be the second primary network device in the abovementioned embodiments and may be configured to execute each step and/or flow corresponding to the second primary device in the abovementioned method embodiments. Alternatively, the memory 1640 may include a ROM and a RAM and provides an instruction and data for the processor. A part of the memory may further include a nonvolatile RAM. For example, the memory may further store information of a device type. The processor 1620 may be configured to execute the instruction stored in the memory. When the processor executes the instruction, the processor may execute each step corresponding to the second primary network device in the abovementioned method embodiments.

Figure 17:
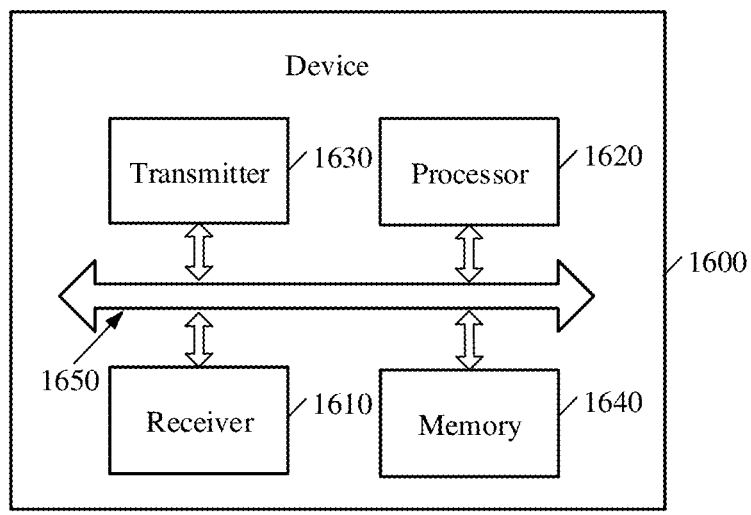
FIG. 17 illustrates another schematic block diagram of a device for data transmission according to an embodiment of the disclosure.

FIG. 17 illustrates a device for data transmission 1700 according to an embodiment of the disclosure. The device 1700 includes a receiver 1710, a processor 1720, a sender 1730, a memory 1740 and a bus system 1750. The receiver 1710, the processor 1720, the sender 1730 and the memory 1740 are connected through the bus system 1750. The memory 1740 is configured to store an instruction. The processor 1720 is configured to execute the instruction stored in the memory 1740 to control the receiver 1710 to receive a signal and control the sender 1730 to send an instruction.

The receiver 1710 is configured to receive a secondary connection addition request message sent by a first primary network device, the secondary connection addition request message being configured to request a secondary connection between the secondary network device and a terminal device to be established. The sender 1730 is configured to send configuration information of the secondary connection to the first primary network device according to the secondary connection addition request message, the configuration information of the secondary connection being configured to establish the secondary connection.

It is to be understood that the device 1700 may specifically be the secondary network device in the abovementioned embodiments and may be configured to execute each step and/or flow corresponding to the secondary network device in the abovementioned method embodiments. Alternatively, the memory 1740 may include a ROM and a RAM and provides an instruction and data for the processor. A part of the memory may further include a nonvolatile RAM. For example, the memory may further store information of a device type. The processor 1720 may be configured to execute the instruction stored in the memory. When the processor executes the instruction, the processor may execute each step corresponding to the secondary network device in the abovementioned method embodiments.

It is to be understood that, in the embodiments of the disclosure, the processor 1420, the processor 1520, the processor 1620 and the processor 1720 may be Central Processing Units (CPUs) and the processors may also be other universal processors, Digital Signal Processors (DSPs), ASICs, Field-Programmable Gate Arrays (FPGAs) or other programmable logic devices, discrete gate or transistor logic devices and discrete hardware components and the like. The universal processor may be a microprocessor or the processor may also be any conventional processor and the like.

It should be understood that term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for data transmission, comprising:
   transmitting, by a first primary network device, first indication information to a terminal device, the first indication information being configured to instruct the terminal device to transmit measurement result information of a secondary network device to the first primary network device,
   receiving, by the first primary network device, the measurement result information of the secondary network device, transmitted by the terminal device in a process of accessing the first primary network device, the measurement result information being configured to indicate link quality between the secondary network device and the terminal device;

determining, by the first primary network device, to establish a secondary connection between the secondary network device and the terminal device according to the link quality between the secondary network device and the terminal device; and establishing, by the first primary network device, the secondary connection, wherein receiving, by the first primary network device, the measurement result information of the secondary network device, transmitted by the terminal device in the process of accessing the primary network device comprises:

receiving, by the first primary network device, the measurement result information transmitted by the terminal device according to the first indication information.

2. The method of claim 1, wherein receiving, by the first primary network device, the measurement result information of the secondary network device, transmitted by the terminal device in the process of accessing the first primary network device comprises:

receiving, by the first primary network device, the measurement result information carried in a Radio Resource Control (RRC) connection establishment request message or an RRC connection establishment complete message.

3. The method of claim 1, wherein receiving, by the first primary network device, the measurement result information of the secondary network device, transmitted by the terminal device in the process of accessing the primary network device comprises:

receiving, by the first primary network device, the measurement result information carried in a handover complete message from the terminal device, the handover complete message being further configured to indicate that a network device serving the terminal device has been switched from a second primary network device to the first primary network device.

4. The method of claim 1, wherein receiving, by the first primary network device, the measurement result information of the secondary network device, transmitted by the terminal device in the process of accessing the primary network device comprises:

receiving, by the first primary network device, the measurement result information carried in a handover request message from the second primary network device, the handover request message being further configured to request a network device serving the terminal device to be switched from the second primary network device to the first primary network device.

5. The method of claim 4, wherein establishing, by the first primary network device, the secondary connection comprises:

after receiving, by the first primary network device, the measurement result information carried in the handover request message from the second primary network device, transmitting, by the first primary network device, an acknowledgement message of the handover request message to the second primary network device, the acknowledgement message of the handover request message containing configuration information of the secondary connection to enable the second primary network device to transmit the configuration information of the secondary connection to the terminal device and the configuration information of the secondary connection being configured to establish the secondary connection between the secondary network device and the terminal device.

6. The method of claim 1, wherein establishing, by the first primary network device, the secondary connection comprises:

transmitting, by the first primary network device, a secondary connection addition request message to the secondary network device, the secondary connection addition request message being configured to request the secondary network device to be added as a network device for data transmission;

receiving, by the first primary network device, an acknowledgement message of the secondary connection addition request message from the secondary network device, the acknowledgement message of the secondary connection addition request message carrying the configuration information of the secondary connection and the configuration information of the secondary connection being configured to establish the secondary connection between the secondary network device and the terminal device;

acquiring, by the first primary network device, the configuration information of the secondary connection; and transmitting, by the first primary network device, the configuration information of the secondary connection to the terminal device.

7. The method of claim 1, wherein determining, by the first primary network device, to establish the secondary connection between the secondary network device and the terminal device according to the measurement result information comprises:

determining, by the first primary network device, to establish the secondary connection between the secondary network device and the terminal device according to a load condition of the first primary network device and the measurement result information.

8. The method of claim 1, further comprising:

transmitting, by the first primary network device, configuration information of a primary connection to the terminal device, the configuration information of the primary connection being configured for the terminal device to establish the primary connection with the first primary network device, and the primary connection being configured for data transmission.

9. The method of claim 1, wherein the first primary network device is a network device in a Long Term Evolution (LTE) network and the secondary network device is a network device in a 5th-Generation (5G) network.

10. The method of claim 1, wherein the secondary connection is configured to transmit at least one of first control-plane data or user-plane data.

11. A method for data transmission, comprising:

receiving, by a terminal device, first indication information transmitted by a first primary network device, the first indication information being configured to instruct the terminal device to transmit measurement result information of a secondary network device to the first primary network device, transmitting, by the terminal device, the measurement result information of the secondary network device to the first primary network device in a process of accessing the first primary network device, to enable the first primary network device to acquire configuration information of a secondary connection according to the measurement result information, the measurement result information being configured to indicate link quality between the secondary network device and the terminal device;

receiving, by the terminal device, the configuration information of the secondary connection from the first primary network device; and accessing, by the terminal device, the secondary network device through configuration information of the secondary connection, wherein transmitting, by the terminal device, the measurement result information of the secondary network device to the first primary network device in the process of accessing the first primary network device comprises:

transmitting, by the terminal device, the measurement result information to the first primary network device in the process of accessing the first primary network device according to the first indication information.

12. The method of claim 11, wherein transmitting, by the terminal device, the measurement result information of the secondary network device to the first primary network device in the process of accessing the first primary network device comprises:

transmitting, by the terminal device, the measurement result information to the first primary network device through a Radio Resource Control (RRC) connection establishment request message or an RRC connection establishment complete message; or, transmitting, by the terminal device, the measurement result information to the first primary network device through a second primary network device, the measurement result information being carried in a measurement report transmitted to the second primary network device by the terminal device, to enable the second primary network device to transmit a handover request message to the first primary network device according to the measurement report, the handover request message carrying the measurement result information and the handover request message being further configured to request a network device serving the terminal device to be switched from the second primary network device to the first primary network device; or, transmitting, by the terminal device, the measurement result information to the first primary network device through a handover complete message, the handover complete message being further configured to indicate that the network device serving the terminal device has been switched from the second network device to the first primary network device.

13. The method of claim 11, before transmitting, by the terminal device, the measurement result information of the secondary network device to the first primary network device in the process of accessing the first primary network device, further comprising:

when channel quality between the terminal device and the secondary network device meets a preset condition, transmitting, by the terminal device, the measurement result information to the first primary network device in the process of accessing the first primary network device.

14. The method of claim 11, further comprising:

receiving, by the terminal device, configuration information of a primary connection from the first primary network device, the configuration information of the primary connection being configured for the terminal device to establish the primary connection with the first primary network device, and the primary connection being configured for data transmission.

15. A device for data transmission, comprising:

a processor; and a memory, storing instructions, which, when executed by the processor, cause the processor to perform one or more actions comprising:

transmitting measurement result information of a secondary network device to a first primary network device in a process of accessing the first primary network device, to enable the first primary network device to acquire configuration information of a secondary connection according to the measurement result information, the measurement result information being configured to indicate link quality between the secondary network device and the device;

receiving the configuration information of the secondary connection from the first primary network device; and accessing the secondary network device according to the configuration information of the secondary connection.

16. The device of claim 15, wherein transmitting measurement result information of the secondary network device to the first primary network device in the process of accessing the first primary network device comprises:

transmitting the measurement result information to the first primary network device through a Radio Resource Control (RRC) connection establishment request message or an RRC connection establishment complete message.

17. The device of claim 15, wherein transmitting measurement result information of the secondary network device to the first primary network device in the process of accessing the first primary network device comprises:

transmitting the measurement result information to the first primary network device through a second primary network device, the measurement result information being carried in a measurement report transmitted to the second primary network device by the device to enable the second primary network device to transmit a handover request message to the first primary network device according to the measurement report, the handover request message carrying the measurement result information and the handover request message being further configured to request a network device serving the device to be switched from the second primary network device to the first primary network device.

18. The device of claim 15, wherein transmitting measurement result information of a secondary network device to a first primary network device in a process of accessing the first primary network device comprises:

transmitting the measurement result information to the first primary network device through a handover complete message, the handover complete message being further configured to indicate that the network device serving the device has been switched from the second primary network device to the first primary network device.

19. The device of claim 15, wherein the one or more actions further comprises:

before the device transmits the measurement result information of the secondary network device to the first primary network device in the process of accessing the first primary network device, receiving first indication information transmitted by the first primary network device, the first indication information being configured to instruct the device to transmit the measurement result information to the first primary network device; and wherein transmitting measurement result information of a secondary network device to a first primary network device in a process of accessing the first primary network device comprises:

transmitting the measurement result information to the first primary network device in the process of accessing the first primary network device according to the first indication information.

20. The device of claim 15, wherein the one or more actions further comprises:

before the device transmits the measurement result information of the secondary network device to the first primary network device in the process of accessing the first primary network device, when channel quality between the device and the secondary network device meets a preset condition, transmitting, the measurement result information to the first primary network device in the process of accessing the first primary network device.

\* \* \* \* \*